US012424783B2

(12) United States Patent
Brungard et al.

(10) Patent No.: US 12,424,783 B2
(45) Date of Patent: Sep. 23, 2025

(54) CONFIGURABLE ELECTRICAL CONNECTOR

(71) Applicant: FCI USA LLC, Etters, PA (US)

(72) Inventors: Thomas A. Brungard, Lewisberry, PA (US); Steven E. Pressel, Harrisburg, PA (US)

(73) Assignee: FCI USA LLC, Etters, PA (US)

( * ) Notice: Subject to any disclaimer, the term of this patent is extended or adjusted under 35 U.S.C. 154(b) by 435 days.

(21) Appl. No.: 17/949,407

(22) Filed: Sep. 21, 2022

(65) Prior Publication Data

US 2023/0088468 A1 Mar. 23, 2023

Related U.S. Application Data

(60) Provisional application No. 63/247,002, filed on Sep. 22, 2021.

(51) Int. Cl.
*H01R 13/502* (2006.01)
*H01R 13/41* (2006.01)

(52) U.S. Cl.
CPC ........... *H01R 13/502* (2013.01); *H01R 13/41* (2013.01)

(58) Field of Classification Search
CPC .... H01R 13/502; H01R 13/41; H01R 12/727; H01R 12/7052; H01R 12/7088; H01R 12/58; H01R 13/514; H01R 2107/00
See application file for complete search history.

(56) References Cited

U.S. PATENT DOCUMENTS

2004/0235357 A1* 11/2004 Allison .............. H01R 12/7088 439/660
2007/0202748 A1 8/2007 Daily et al.
(Continued)

FOREIGN PATENT DOCUMENTS

KR 10-2021-0003302 A 1/2021

OTHER PUBLICATIONS

International Search Report and Written Opinion mailed Jan. 10, 2023 in connection with International Application No. PCT/US2022/044191.

(Continued)

*Primary Examiner* — Abdullah A Riyami
*Assistant Examiner* — Nader J Alhawamdeh
(74) *Attorney, Agent, or Firm* — Wolf, Greenfield & Sacks, P.C.

(57) ABSTRACT

An electrical connector is provided with a segmented design supporting multiple connector configurations with commonality across the configurations that simplifies connector selection and qualification. The connector includes multiple segments, each with an insulative housing portion into which may be inserted power terminals in one or more configurations or signal terminals. A first-type power terminal may carry a first maximum power and a second-type power terminals may carry a second maximum power greater than the first maximum power, but the segments may be configured with mating contacts with similar properties. The connectors may have a mezzanine configuration configurable in a stack height selected from a wide range of stack heights, with fine-grained resolution. Terminals in all stack heights may have similar mating and mounting portions, differing only in the height of a body portion.

20 Claims, 26 Drawing Sheets

(56) References Cited

U.S. PATENT DOCUMENTS

| | | | | |
|---|---|---|---|---|
| 2015/0056833 | A1* | 2/2015 | Brungard ........... | H01R 12/7088 29/842 |
| 2015/0303601 | A1* | 10/2015 | Jeon ................... | H01R 12/7082 439/65 |
| 2023/0088468 | A1* | 3/2023 | Brungard ........... | H01R 12/7088 439/701 |

OTHER PUBLICATIONS

[No Author Listed], PwrBlade+ Connector. Amphenol Communications Solutions. 2022, 2 pages. URL:https://www.amphenol-cs.com/product-series/pwrblade-plus.html [Last accessed Oct. 12, 2022].

* cited by examiner

CONFIGURABLE ELECTRICAL CONNECTOR

CROSS-REFERENCE TO RELATED APPLICATIONS

The present application claims the benefit of priority of U.S. Provisional Application No. 63/247,002 filed Sep. 22, 2021, entitled "CONFIGURABLE ELECTRICAL CONNECTOR", the entire contents of which is incorporated by reference herein.

FIELD

This disclosure relates generally to electrical interconnection systems and more specifically to compact electrical connectors.

BACKGROUND

Electrical connectors are used in many electronic systems. In general, various electronic devices (e.g., smart phones, tablet computers, desktop computers, notebook computers, digital cameras, and the like) have been provided with assorted types of connectors whose primary purpose is to allow separable connections for power, data, commands, and/or other signals between subassemblies of an electronic device. Connectors in many configurations are commercially available, differing in design based on the device configuration in which they are intended to be used, as well as other parameters of use, such as number and speed of data signals and/or the amount of current or number of power circuits that are to pass through the connector. Mechanical parameters of connector operation may also vary from connector to connector, such as the desired mating or contact force.

One type of electrical connector is a mezzanine connector, which may be used in devices in which connections are to be made between two printed circuit boards (PCBs) in parallel. The perpendicular distance between the PCBs, when joined through a mated pair of mezzanine connectors may be referred to herein as "stack height." Stack height is another parameter of a mezzanine connector that a designer of an electronic device may need to select, as the stack height may impact the amount of space inside the device to mount components on PCBs joined through the mezzanine connectors.

As a result of the range of parameters that may impact connector selection and performance, a designer of an electronic system may spend consider time on connector selection and qualification. As the designer creates designs for a new device, the designer may investigate available connectors to select a particular connector as a candidate for use in manufacture of the device. Before manufacturing that device in quantity, however, the designer may qualify the selected connector, including testing the performance and reliability of the selected connector to ensure that it work in the device when mass produced. This selection and qualification can be time consuming and may be repeated for each new device design as well as modifications of an existing device design that results in the need to select a different connector.

SUMMARY

According to an aspect of the present technology, an electrical connector is provided that may be comprised of: an insulative housing comprised of a mating surface configured to face a mating connector when the electrical connector and the mating connector are in a mated position; a plurality of conductive first power terminals attached to the housing and exposed at the mating surface through first openings in the housing; a plurality of conductive second power terminals attached to the housing and exposed at the mating surface through second openings in the housing; and a plurality of conductive signal terminals attached to the housing and exposed at the mating surface through third openings in the housing. Each of the first power terminals may be configured to a carry a first maximum power. Each of the second power terminals may be configured to carry a second maximum power greater than the first maximum power.

According to another aspect of the present technology, an electrical connector is provided that may be comprised of: a plurality of power segments aligned in a length direction, each of the power segments being comprised of a conductive power terminal attached to a first insulative housing portion, the power terminal being elongated in a width direction perpendicular to the length direction; a plurality of signal segments aligned in the length direction, each of the signal segments being comprised of a plurality of conductive signal terminals attached to a second insulative housing portion; a first end segment comprised of a first insulative end portion and a first mounting post disposed in the first insulative end portion, and a second end segment comprised of a second insulative end portion and a second mounting post disposed in the second insulative end portion. The power segments and the signal segments may be disposed between the first and second end segments. The first and second mounting posts may be configured to attach the first and second end segments, respectively, to a substrate. Each of the first and second end segments may be comprised of a mating structure configured to engage with a corresponding mating structure of a mating connector when the electrical connector and the mating connector are in a mated position. The first and second housing portions and the first and second end portions may be attached to each other to form a housing comprised of a mating surface configured to face a mating connector when the electrical connector and the mating connector are in the mated position. The power terminals and the signal terminals may be exposed at the mating surface and are configured to electrically contact respective mating terminals of the mating connector when the electrical connector and the mating connector are in the mated position.

According to a further aspect of the present technology, an electrical connector is provided that may be comprised of: an insulative housing comprised of a mating surface configured to face a mating connector when the electrical connector and the mating connector are in a mated position; a plurality of conductive power terminals attached to the housing and exposed at the mating surface through first openings in the housing, the power terminals being arranged in a column in a length direction of the housing, each of the power terminals being elongated in a width direction perpendicular to the length direction; and a plurality of conductive signal terminals attached to the housing and exposed at the mating surface through second openings in the housing, the signal terminals being arranged in a plurality of rows in the width direction, each of the rows containing at least two of the signal terminals. The housing may be comprised of first and second end portions on opposite ends of the housing. Each of the first and second end portions may be comprised of a mating structure configured to engage with a corresponding mating structure of a mating connector when the electrical connector and the mating connector are in a mated position.

According to another aspect of the present technology, an electrical connector is provided that may be comprised of: a plurality of first power segments aligned in a length direction, each of the first power segments being comprised of at least two conductive first power terminals attached to an insulative first housing portion, each of the first power terminals being elongated in a width direction perpendicular to the length direction; a plurality of second power segments aligned in the length direction, each of the second power segments being comprised of a conductive second power terminal attached to an insulative second housing portion, the second power terminal being elongated in the width direction; and a plurality of signal segments aligned in the length direction, each of the signal segments being comprised of a plurality of conductive signal terminals attached to an insulative third housing portion and arranged in a row in the width direction. Each of the first power terminals may be configured to a carry a first maximum power. Each of the second power terminals may be configured to carry a second maximum power greater than the first maximum power.

The foregoing features may be used, separately or together in any combination, in any of the embodiments discussed herein.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
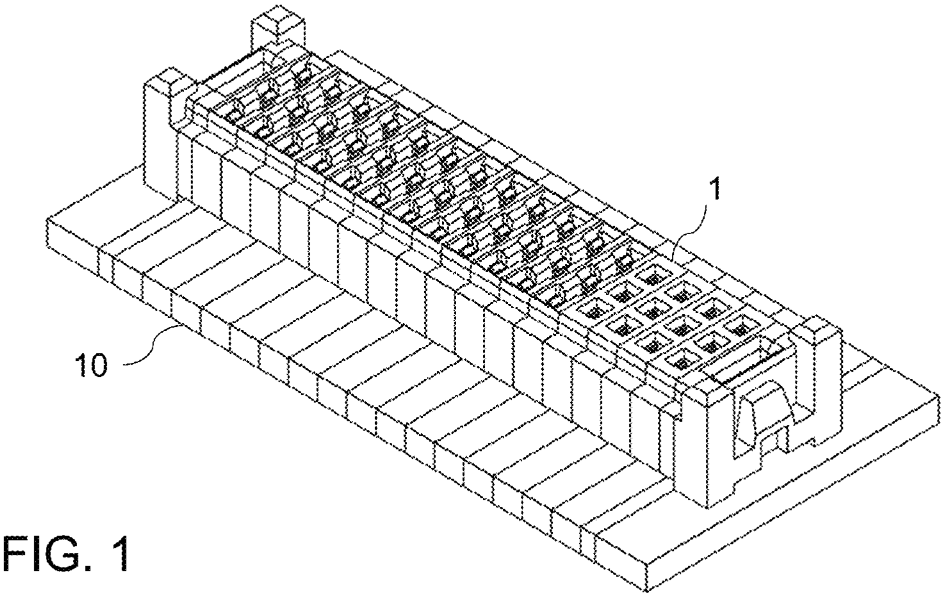
FIG. 1 is a top front perspective view of an exemplary embodiment of a receptacle connector.

The inventors have recognized and appreciated designs for connectors that may ease the burden of connector selection and qualification. These designs may result in connectors that may be easily configured for any of a number of applications with consistent mating interfaces and other properties. Designers of electronic devices may develop a design using a connector of one configuration and easily and confidently adapt their design to use a connector, based on the same design techniques, for another configuration, which eases the burden of selection and qualification. As one example, the design techniques may facilitate variation in the amount of power carried by a circuit and/or the number of circuits within a connector. Additionally, techniques as described herein may be used to produce low profile connectors that provide reliable operation for high-integrity electrical interconnects.

As another example, the stack height of a mezzanine connector may be easily configured by selecting from among a set of plug and receptacle heights to provide stack heights in increments that collectively span in fine-grained increments, such as 8.0 mm to 20.0 mm in increments of 1 mm. For example, a plug connector may have a mating height in a range of 2.00 mm to 8.00 mm (e.g., 2.50 mm, 3.50 mm, 5.50 mm, 7.50 mm), and a receptacle connector may have a mating height in a range of 5.00 mm to 12.00 mm (e.g., 5.50 mm, 7.50 mm, 9.50 mm, 11.50 mm).

According to some aspects, a connector may have a segmented construction, which may provide flexibility to configure each segment, e.g., a desired number of signal terminals or a desired number of power terminals in each connector. In some embodiments, the connector may be comprised of a plurality of segments corresponding to rows of the connector. By selecting the configuration for each segment, the connector may be constructed with a plurality of signal rows and a plurality of power rows sandwiched between first and second end rows. A width of each row may correspond to a width of the connector. Each signal segment may have a plurality of signal terminals disposed in an insulative housing and aligned in a width direction of the connector.

The power segments may be configured as first power segments and/or second power segments. Each first power segment may have at least two first power terminals disposed in an insulative housing and aligned in the width direction of the connector, with each first power terminal having a contact portion configured to electrically contact a corresponding contact portion of a mating connector when the connector and the mating connector are in a mated position.

Each second power segment may have a power terminal with multiple contact portions, with the same configuration as the contact portions of the terminals in the first power segments. In the second power segments, however, the contact portions may be integrally formed. As a specific example, the second power segments may each have a single second power terminal disposed in an insulative housing and elongated in the width direction of the connector. Each second power terminal may have a plurality of contact portions. In some embodiments, the number of contact portions in each second power terminal may be the same as the number of first power terminals in each first power segment.

For example, the connector may be a receptacle connector and the contact portions may be comprised of interdigitated fingers configured to grasp and electrically contact power tabs of a plug connector. In another example, the connector may be a plug connector and the contact portions may be comprised of power tabs configured to be grasped by and electrically contact interdigitated fingers of a receptacle connector. Each first power terminal may be configured to carry a relatively lower maximum power than each second power terminal. In some embodiments, the first and second power segments may be aligned in the connector such that the contact portions of the first and second power segments form columns of contact portions that may extend in a direction perpendicular to the rows of the connector.

In some embodiments, each of the first and second power segments of the connector may have a separation region between adjacent contact portions, such that a columnar structure may extend in a direction perpendicular to the rows of the connector. For example, the connector may be a plug connector, and the columnar structure may be a longitudinal raised rib that spans across the first and second power segments. In another example, the connector may be receptacle connector, and the columnar structure may be a longitudinal recess that spans across the first and second power segments. In some embodiments, the longitudinal raised rib of a segmented plug connector may be configured to nest or be seated in the longitudinal recess of the receptacle connector when the plug and receptacle connectors are mated together. In some embodiments, the columnar structure may be centrally located (e.g., at mid-width). In other embodiments, the columnar structure may be offset to one side or the other of the central location to ensure that the plug and receptacle combination mate with a predefined orientation.

According to some aspects, a connector may have a segmented construction, similar to the one described in the previous paragraph, but with a single type of power terminal. In some embodiments, each of the power segments of the connector may be comprised of a single first power terminal disposed in an insulative housing and elongated in the width direction of the connector, such that the contact portion of each of the first power terminals are aligned in a single column, resulting in a narrower connector, which may have the same mating contacts as a wider connector. In some embodiments, the insulative housings of the power segments and the signal segments may each have a surface profile such that, when an insulative housing is formed from multiple such segments, the surface profiles of the segments collectively result in an elongated structure configured to engage with a corresponding elongated structure of a mating connector. For example, the elongated structure may be an elongated ledge configured to be accommodated in an elongated corner structure of a mating connector when in a mated position.

In some embodiments, the segments of the connector may be separately formed and then joined together, such as by fusing the insulative housing of each segment to the insulative housing of an adjacent segment and/or by cementing or gluing each segment to an adjacent segment. Alternatively, insulative portions of the segments may be formed in a mold made up of segments corresponding to the segments of the connector. The mold segments may be held in a common fixture or otherwise held together to create a molded housing with the desired configuration of segments. Corresponding terminals may then be inserted into the segments of the molded housing. In this way, a connector may be formed with an insulative housing holding an array of signal terminals and at least one array of power terminals.

Alternatively or additionally, molds may be constructed for molding insulative housings for some or all of the desired connector configurations. Such housings may also have a signal portion and a power portion and any or all of the structures that may result from forming a connector housing from a plurality of segments as described herein. For example, the signal portion may be comprised of signal terminals inserted into the insulative housing and arranged in rows and columns. The power portion may be comprised of a plurality of rows of first power terminals and a plurality of rows of second power terminals inserted into the insulative housing.

Figure 2:
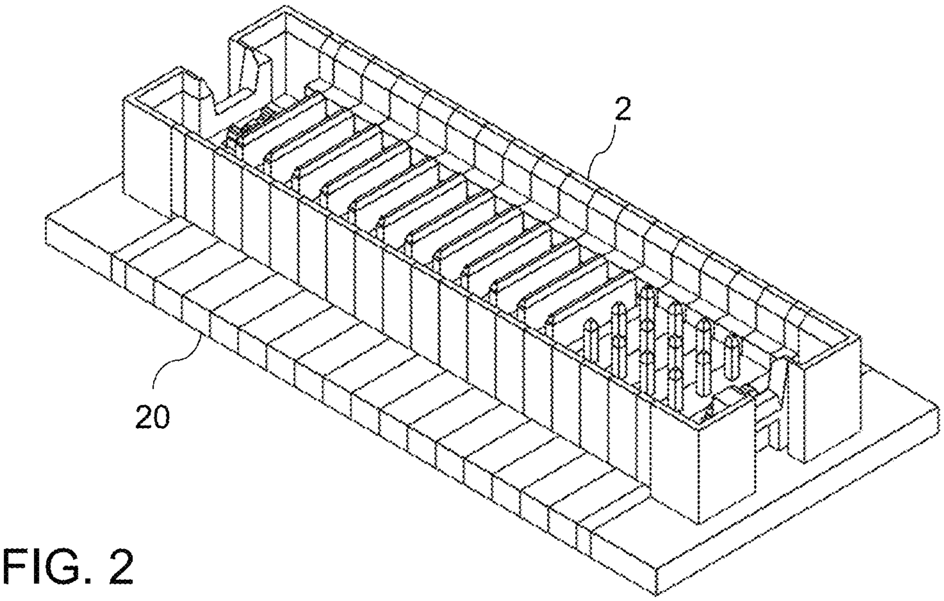
FIG. 2 is a top rear perspective view of an exemplary embodiment of a plug connector.

Turning now to the figures, FIG. 1 depicts an example of a receptacle connector 1 mounted to a substrate 10, according to some embodiments. FIG. 2 depicts an example of a plug connector 2 mounted to a substrate 20, according to some embodiments. For example, one or both of the substrates 10, 20 may be a printed circuit board ("PCB") comprised of electrical wiring formed on and/or within the PCB. The receptacle connector 1 may be mated with the plug connector 2 to form a mated pair that is able to perform electrical transmissions (e.g., signals, power) relative to each. In some embodiments, the connectors 1, 2, may be mezzanine connectors that, when mated together, have a stack height determined by respective mating heights of the connectors 1, 2. For example, the stack height may be a perpendicular distance between the substrate 10 and the substrate 20 when the connectors 1, 2, are mated together.

For clarity of illustration, the receptacle connector 1 and the plug connector 2 are illustrated as multiple segments, aligned side-by-side. Such an illustration reveals that the connector has multiple segments of a limited number of types. As noted above, the connector housing may be constructed by separately forming and then joining insulative housings for these segments or may be formed from one or more modules containing multiple such segments. A segmented connector may be constructed with a single or unitary insulative power housing structured to accommodate the power terminals 1100 joined with a single or unitary insulative signal housing structured to accommodate the signal terminals 1200. In yet other embodiments, the entire housing of a connector may be unitarily formed, such as by molding plastic, nylon or other insulative material.

Likewise, the substrates 10, 20 are shown in segments, corresponding to segments to which each of the connector segments is mounted. The segments of the substrates 10, 20 may be configured with plated vias or other mounting structures to receive tails of the terminal(s) in the corresponding connector segment. The illustration does not suggest a requirement that the segmented sections be manufactured separately and then joined.

Figure 3:
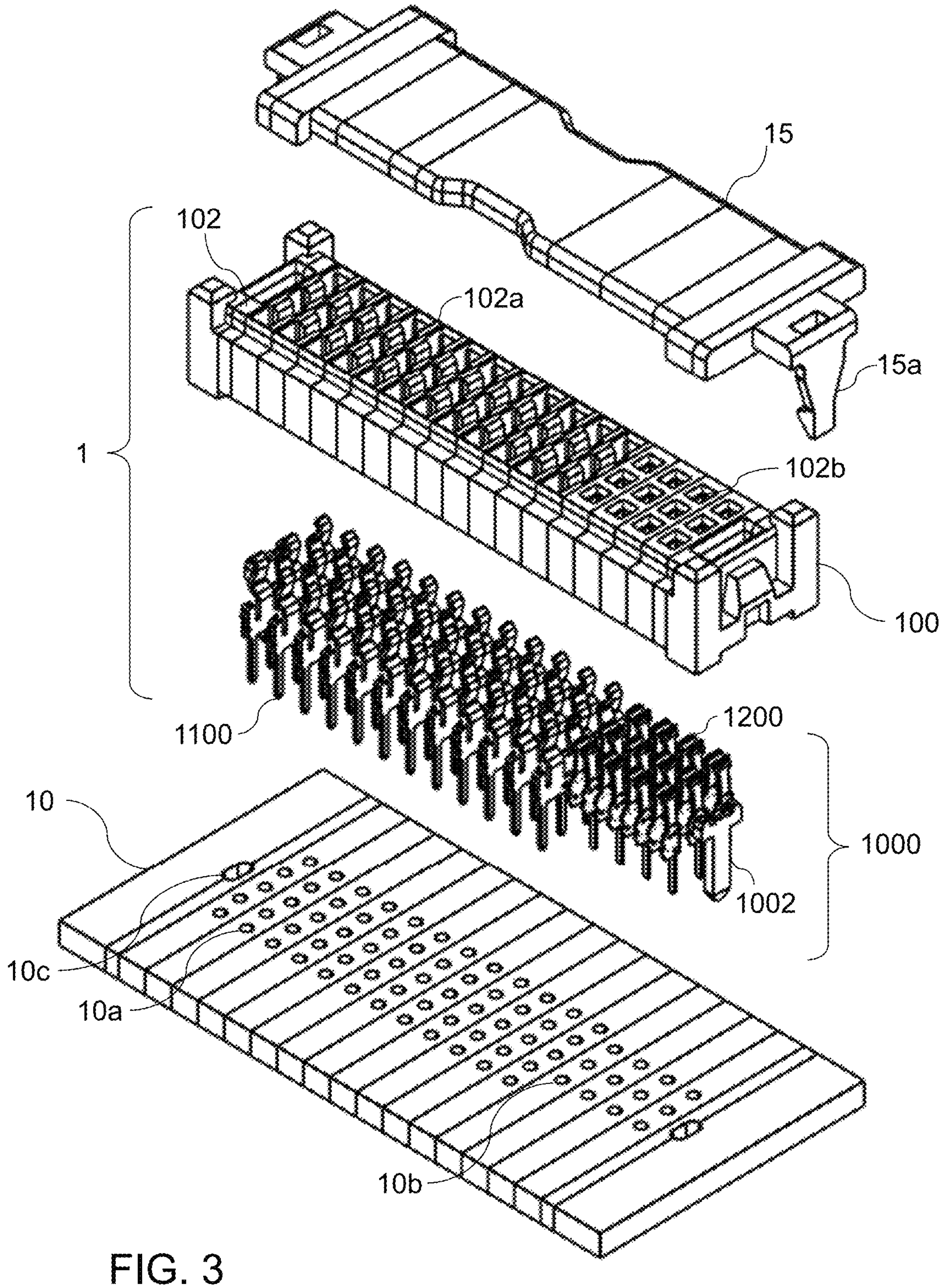
FIG. 3 is a top front perspective view of the receptacle connector of FIG. 1, in a partially disassembled state, together with a receptacle substrate and an exemplary embodiment of a receptacle cap.

FIG. 3 shows the receptacle connector 1 in a partially disassembled state, according to some embodiments. In some embodiments, a removable receptacle cap 15 may be used to protect a portion of the connector 1 when not in use and/or to provide a flat upper surface that may be grasped by or pressed on by manufacturing equipment during the manufacture of the connector and/or mounting of it to a substrate. A plurality of latch portions 15*a* may be provided on the cap 15 and configured to latch with the connector 1. For example, the latch portions 15*a* may be provided on opposite ends of the cap 15. The connector 1 may be comprised of an insulative housing 100 and a plurality of terminals 1000 disposed at least partially in the housing 100. In some embodiments, the terminals 1000 may be comprised of power terminals 1100, and signal terminals 1200. The terminals 1000 may have mounting ends configured to mount to the substrate 10. In some embodiments, the mounting ends of the terminals 1000 may be configured to extend through holes 10*a*, 10*b*, 10*c* in the substrate 10 and may be fixedly attached to the substrate 10 by, e.g., soldering. As will be appreciated, attachment techniques other than soldering may be used.

Hold downs 1002 are also shown. The power terminals 1100 and the signal terminals 1200 may be formed of metal or another material having high conductivity. The hold downs 1002 may similarly be formed of metal, which may permit soldering the hold downs 1002 to a substrate. In other embodiments, hold downs 1002 may be formed of a hard plastic or another material having high stiffness that may engage a hole in a substrate through an interference fit or other than through soldering.

In some embodiments, contact portions of the power terminals 1100 and contact portions of the signal terminals 1200 may be exposed through contact openings 102*a*, 102*b* in a mating surface 102 the housing 100. The mating surface 102 may be configured to face a corresponding mating surface of a mating connector (e.g., the plug connector 2) when the connector 1 and the mating connector are mated together.

Figure 4A:
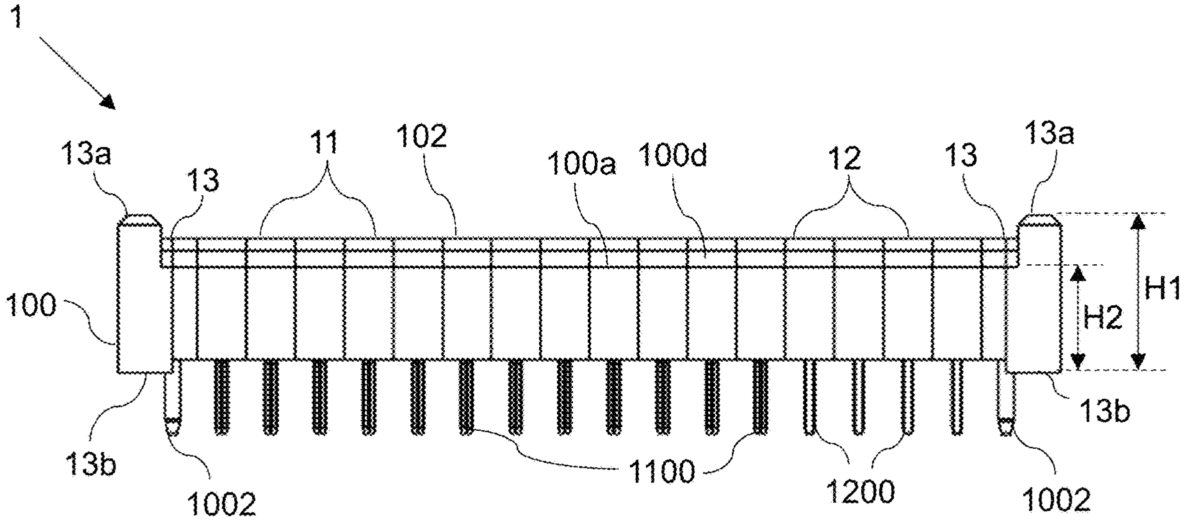
FIGS. 4A and 4B are a side elevational view and a top plan view, respectively, of the receptacle connector of FIG. 1.
Figure 4B:
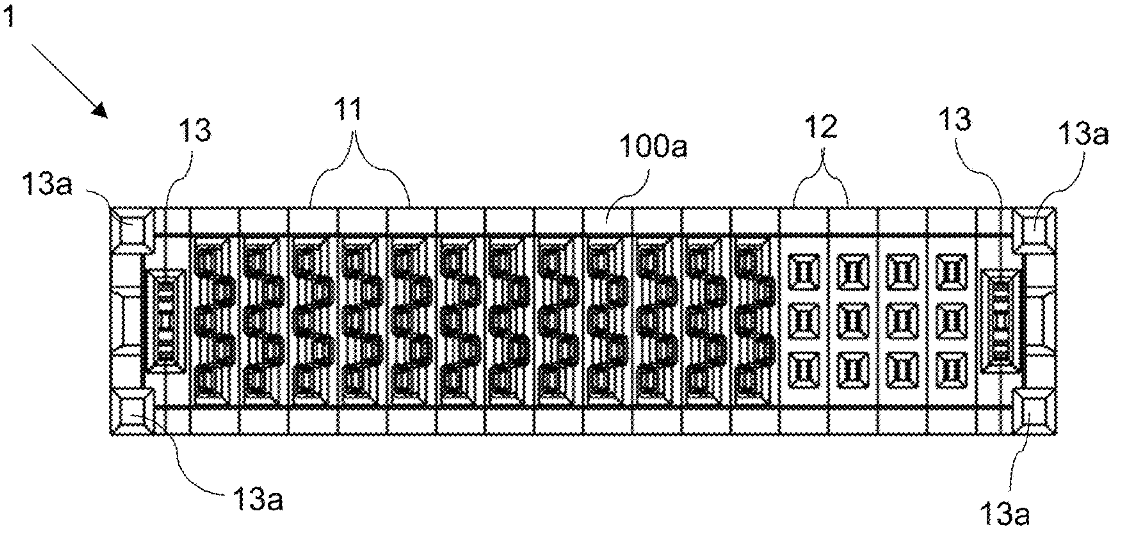

FIG. 4A shows an elevational view of the receptacle connector 1, and FIG. 4B shows top plan view of the connector 1, according to some embodiments. In some embodiments, the connector 1 may be comprised of a plurality of power segments 11, a plurality of signal segments 12, and a pair of end segments 13, discussed below. The end segments 13 may be disposed on opposite ends of the connector 1, such that the power segments 11 and the signal segments 12 may be disposed between the end segments 13. In some embodiments, the power segments 11 may be grouped together and the signal segments 12 may be grouped together, as shown. In some other embodiments, the power segments 11 may be interspersed with the signal segments 12. Optionally, one or more spacer segments (not shown) may be used to separate the power segments 11 from the signal segments 12. Spacer segments, for example, may have an insulative housing, without any terminal inserted into it.

According to some embodiments, each of the end segments 13 may be comprised of a plurality of projections 13*a* extending in a direction away from a mounting surface 13*b*. The projections 13*a* may be mating posts configured to be received in corresponding recesses in a mating connector (e.g., the plug connector 2) when the mating connector is in a mated position with the receptacle connector 1. For example, a pair of projections 13*a* may be located on opposite ends of each of the end segments 13 and may be used to properly align a mating connector with the connector 1. In some embodiments, tips of the projections 13*a* may be beveled to facilitate seating of the projections 13*a* in corresponding recesses in a mating connector.

According to some embodiments, the housing 100 may contact the substrate 10 at the mounting surfaces 13*b* of the end segments 13. In some embodiments, the housing 100 may have a maximum height H1 that extends perpendicularly from a height of an outer edge of the projection 13*a* to a height of the mounting surface 13*b*, as shown in FIG. 4A. A mating height H2 of the receptacle connector 1 may be less than the maximum height H2 and may be a perpendicular distance from the height of the mounting surface 13*b* to a datum defining the mating plane between two mated connectors. That datum, for example, may align with a ledge or contact surface 100*a* of the housing 100. The mating height of a mating connector may use the same datum for defining its mating height such that the stack height of the mated connectors can be determined by adding together the mating heights of the mated connectors. In some embodiments, the mating height H2 of a receptacle connector may be in a range of 5 mm to 12 mm, such as 5.50 mm, or 7.50 mm, or 9.50 mm, or 11.50 mm.

Figure 5A:
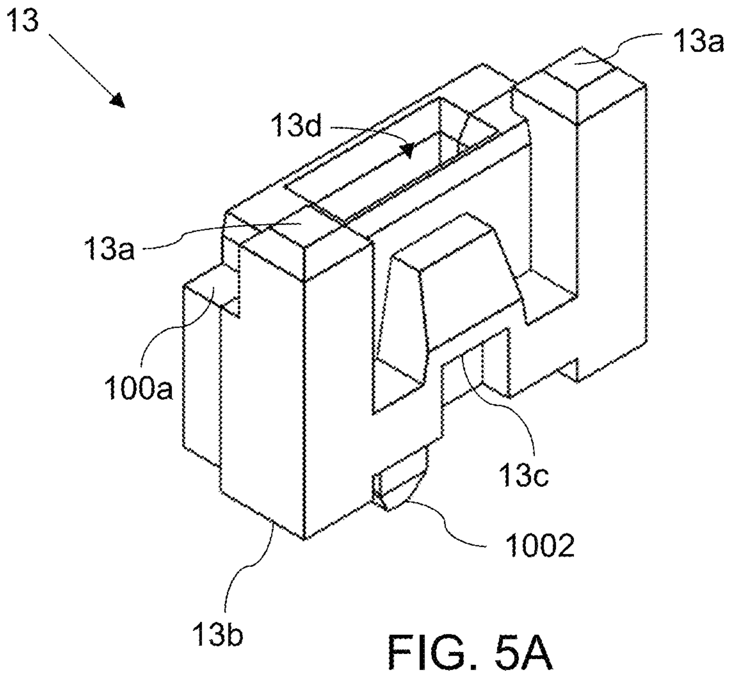
FIG. 5A and FIG. 5B are a top front perspective view and an exploded view, respectively, of an exemplary embodiment of an end segment of the receptacle connector of FIG. 1.
Figure 5B:
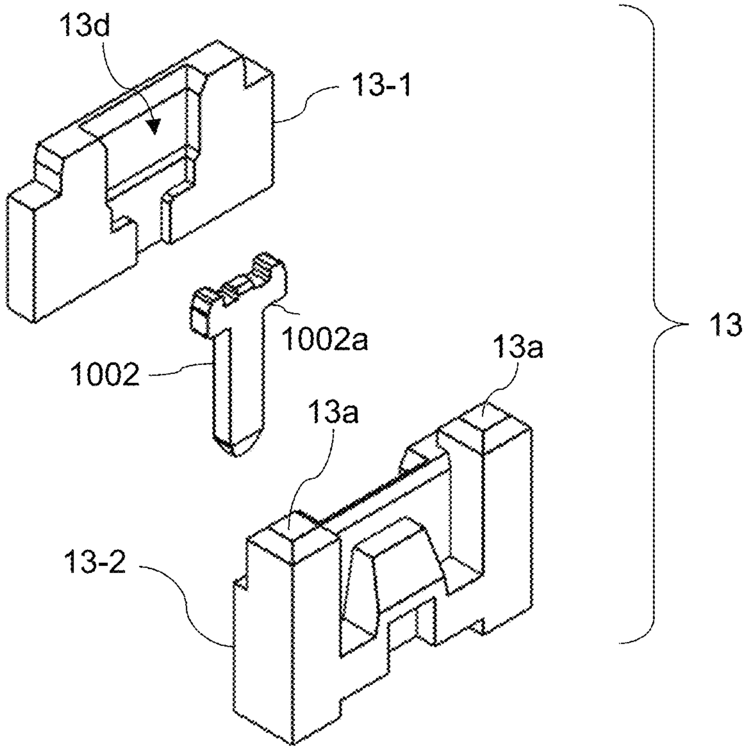

FIG. 5A shows a perspective view of the end segment 13, according to some embodiments, and FIG. 5B shows an exploded view of the end segment 13. in the embodiment of FIG. 3, each end of the connector housing includes an end segment of the same configuration, though with opposite orientation. The end segment 13 may be comprised of a latch portion 13*c* configured to latch with a corresponding latch portion (e.g., the latch portion 15*a*) of the cap 15. The end segment 13 may be comprised of an opening 13*d* through which the hold down 1002 may be inserted and/or adjusted. In some embodiments, the end segment 13 may be comprised of a first end portion 13-1 and a second end portion 13-2 that, when joined together, form a recess shaped to accommodate a portion of the hold down 1002. Alternatively, these portions may be formed as one segment that is then joined with other segments to form the housing or may be integrally formed with one or more other segments of the housing. In some embodiments, the opening 13*d* may be a through-hole 13*d* such that the mounting end of the hold down 1002 may extend through the through-hole 13*d*. For example, in some embodiments, the hold down 1002 may be comprised of shoulders 1002*a* configured to abut against ledges on an internal surface of the through-hole 13*d*. When the end segments 13 are mounted to the substrate 10, the shoulders 1002*a* may serve to hold opposite ends of the receptacle connector 1 against the substrate 10. In some embodiments, the first and second end portions 13-1, 13-2 may be molded around the shoulders 1002*a* of the mounting terminal 1002. In some embodiments, the hold down 1002 may be inserted in the opening 13*d* after the first and second end portions 13-1, 13-2 have been fixed together.

Figure 6A:
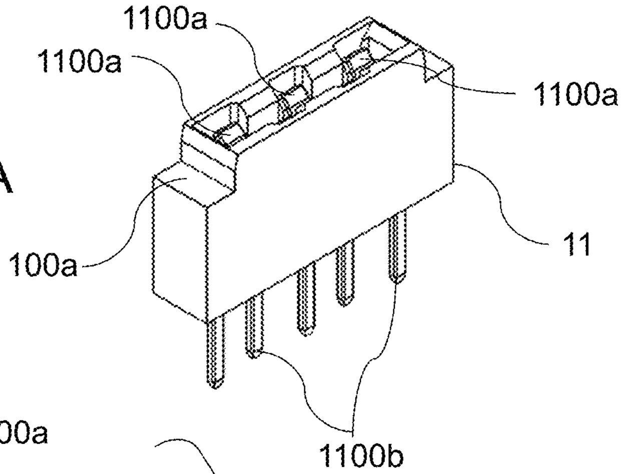
FIG. 6A and FIG. 6B are a top perspective view and an exploded view, respectively, of a power segment of the receptacle connector of FIG. 1.
Figure 6B:
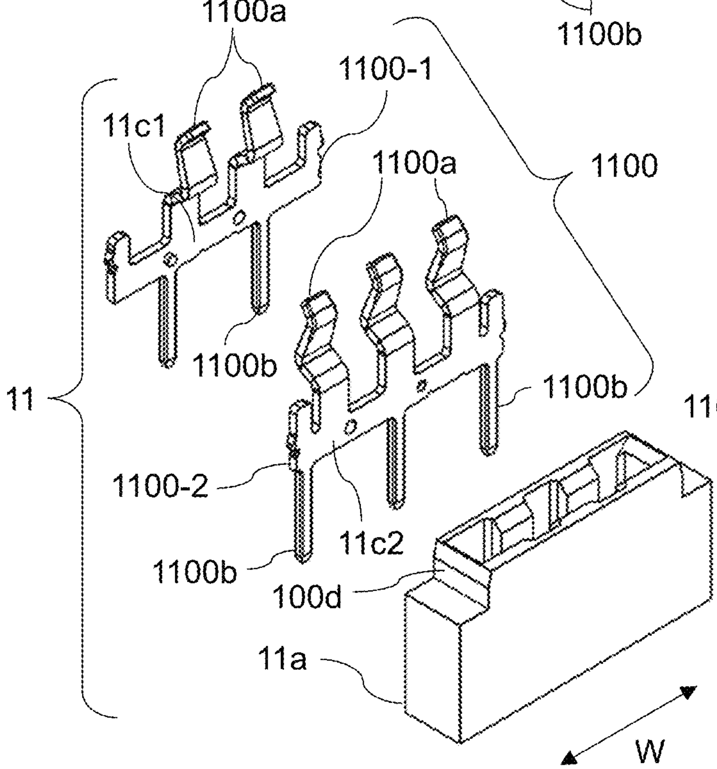
Figure 6C:
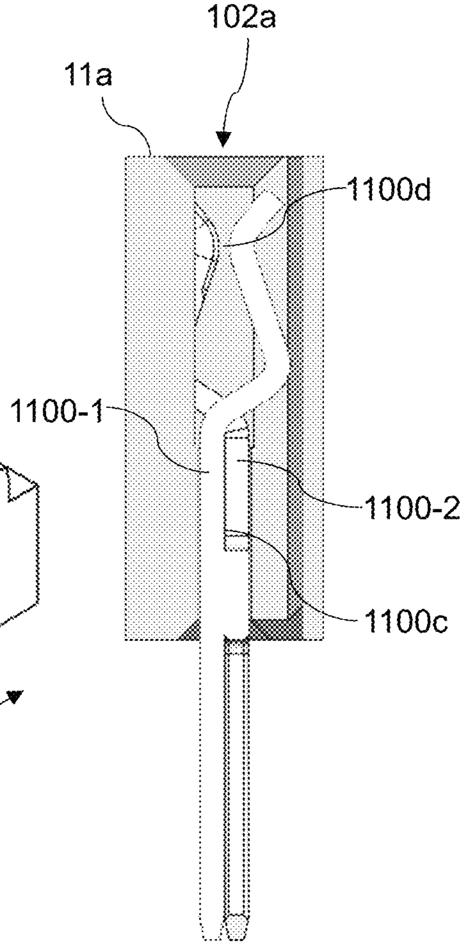
FIG. 6C is a cross section cut midway along a width W of the power segment.

FIG. 6A shows a perspective view of the power segment 11 for a receptacle connector 1, and FIG. 6B shows an exploded view of the power segment 11. FIG. 6C shows a cross section of the power segment 11 cut midway along a width W of the power segment 11. In some embodiments, the power segment 11 may be comprised of a housing portion 11*a* and a power terminal 1100 fixed to the housing portion 11*a*. The power terminal 1100 may be comprised of a plurality of contact fingers 1100*a* extending in a first direction from a common body 1100*c* towards a contact opening 102*a* of the power segment 11. The power terminal 1100 also may be comprised of a plurality of mounting legs 1100*b* extending in a second direction from the common body 1100*c*. The mounting legs 1100*b* may be configured to extend beyond an outer surface of the housing portion 11*a* for mounting to the substrate 10. In some embodiments, the mounting legs 1100*b* may be configured to extend through the holes 10*a* of the substrate 10.

According to some embodiments, each power terminal 1100 may be comprised of first and second finger plates 1100-1, 1100-2. Each of the first and second finger plates 1100-1, 1100-2 may be comprised of a plurality of fingers 1100*a* that are interdigitated with each other. The fingers 1100*a* of the first finger plate 1100-1 may extend from a common body portion 11*c*1, and the fingers 1100*a* of the second finger plate 1100-2 may extend from a common body portion 11*c*2, as shown in FIG. 6B. The common body portions 11*c*1, 11*c*2 may be joined together physically to form the common body 1100*c*. For example, the common body portions 11*c*1, 11*c*2 may have respective joining surfaces configured to contact each other when the common body portions 11*c*1, 11*c*2 are joined together, such that the common body portions 11*c*1, 11*c*2 are electrically shorted together. Common body portions 11*c*1, 11*c*2 may be joined for example, by welding or soldering and/or via mechanical means such as crimping or by force generated by inserting the common body portions snugly into the same opening in the insulative housing. In some embodiments, one or both of the common body portions 11*c*1, 11*c*2 may include features that facilitate electrical connection between then, such as dimples on the contact surface or projections that interlock. Each of the first and second finger plates 1100-1, 1100-2 may have one or more mounting legs 1100*b*. In some embodiments, the mounting legs 1100*b* of the first finger plate 1100-1 may alternate with the mounting legs 1100*b* of the second finger plate 1100-2 in the width direction W when the common body portions 11*c*1, 11*c*2 are joined together.

In some embodiments, each of the fingers 1100*a* may be curved such that, when the fingers 1100 are interdigitated with each other, a contact region 1100*d* may be formed between the fingers 1100*a* of the first finger plate 1100-1 and the fingers 1100*a* of the second finger plate 1100-2. The contact region 1100*d* may be configured such that the fingers 1100*a* of the first and second finger plates 1100-1, 1100-2 flex and press against opposing sides of a contact tab of a mating connector when the mating connector (e.g., the plug connector 2) is in a mated position with the receptacle connector 1. In some embodiments, each of the fingers 1100*a* of the first finger plate 1100-1 may have a first contact surface on a side of the first finger plate 1100-1 opposite to its joining surface, and each of the fingers 1100*a* of the second finger plate 1100-2 may be comprised of a second contact surface on a side of the second finger plate 1100-2 opposite to its joining surface, as shown in FIG. 6C. With such an arrangement, the first contact surfaces of the first finger plate 1100-1 may face in a same direction as the joining surface of the second finger plate 1100-2, and the second contact surfaces of the second finger plate 1100-2 may face in a same direction as the joining surface of the first finger plate 1100-1. Such a configuration may result in forces that tend to force the common body portions 11*c*1, 11*c*2 together, even as the contact forces at the contact surfaces tend to force the fingers of the first finger plate 1100-1 and the second finger plate 1100-2 apart.

Figure 7A:
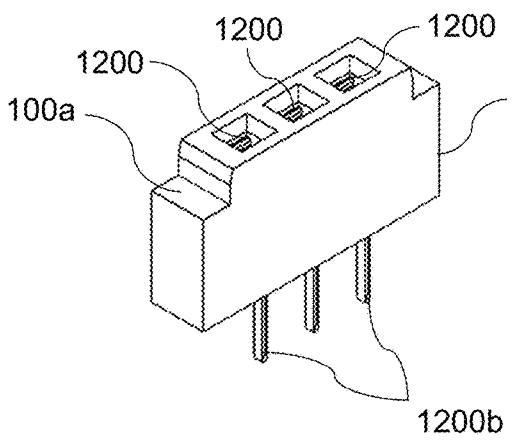
FIG. 7A and FIG. 7B are a top perspective view and an exploded view, respectively, of a signal segment of the receptacle connector of FIG. 1.
Figure 7B:
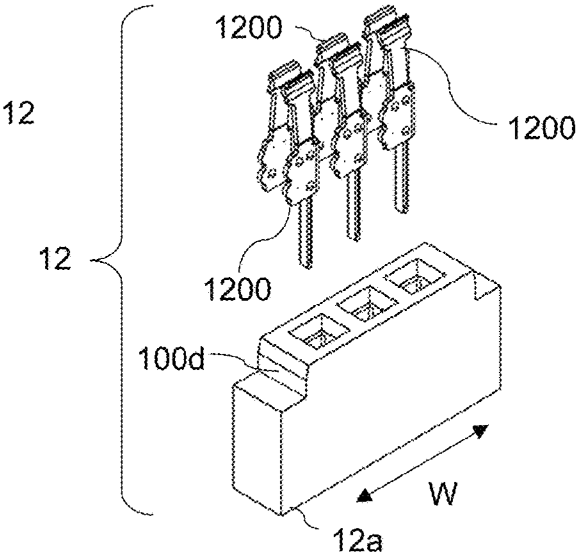
Figure 7C:
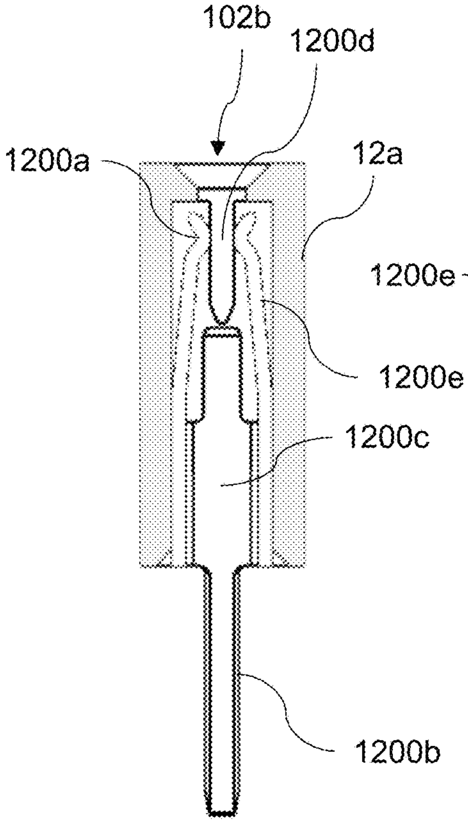
FIG. 7C is a cross section cut midway along a width W of the signal segment.

FIG. 7A shows a perspective view of the signal segment 12, according to some embodiments, and FIG. 7B shows an exploded view of the signal segment 12. FIG. 7C shows a cross section of the signal segment 12 cut midway along a width W of the signal segment 12, according to some embodiments. In some embodiments, each of the signal segments 12 may be comprised of a housing portion 12*a* and a plurality of signal terminals 1200 fixed to the housing portion 12*a*. In the example shown in FIGS. 7A and 7B, a row of three signal terminals 1200 are disposed in the width direction W of the signal segment 12. As will be appreciated, in other embodiments there may be another number of signal terminals 1200.

Figure 8A:
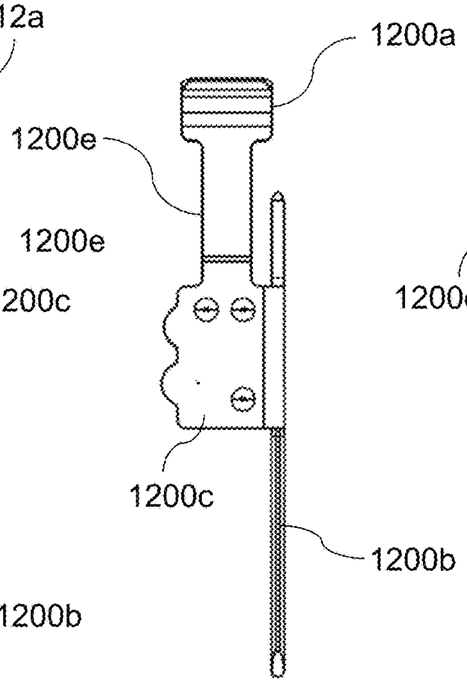
FIGS. 8A and 8B are a side view and a top front perspective view, respectively, of a signal terminal of the receptacle connector of FIG. 1.
Figure 8B:
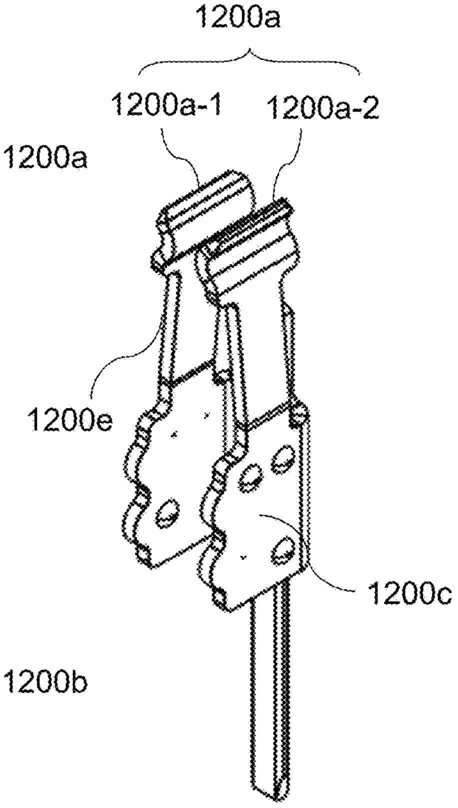

FIGS. 8A and 8B show a side view and a perspective view, respectively, of the signal terminal 1200, according to some embodiments. The signal terminal 1200 may be comprised of a contact portion 1200*a* extending in a first direction from a body 1200*c* towards a contact opening 102*b* of the signal segment 12. The signal terminal 1200 also may be comprised of a mounting leg 1200*b* extending in a second direction from the body 1200*c*, which here is the opposite direction. The mounting leg 1200*b* may be configured to extend beyond an outer surface of the housing portion 12*a* for mounting to the substrate 10. In some embodiments, the mounting leg 1200*b* may be configured to extend through the hole 10*b* of the substrate 10.

According to some embodiments, the contact portion 1200*a* of each signal terminal 1200 may be comprised of first and second contact sections 1200*a*-1, 1200*a*-2. In some embodiments, the first and second contact sections 1200*a*-1, 1200*a*-2 may face each other, such that a contact region 1200*d* may be formed between surfaces of the first and second contact sections 1200*a*-1, 1200*a*-2, as shown in FIG. 7C. In some embodiments, the body 1200*c* may have a U-shaped structure in which the mounting leg 1200*b* extends in the second direction from a central portion of the U-shaped structure and such that a pair of arms extend in the first direction and connect the first and second contact sections 1200*a*-1, 1200*a*-2 to the body 1200*c*, as shown in FIGS. 7C, 8A, and 8B. For example, the first and second contact sections 1200*a*-1, 1200*a*-2 and the arms 1200*e* of the signal terminal 1200 may resemble a clip such that, when a contact pin of a mating connector (e.g., the plug connector 2) is inserted in the contact region 1200*d* during a mating operation with the receptacle connector 1, the first and second contact sections 1200*a*-1, 1200*a*-2 may flex and press against opposite surfaces of the contact pin of a mating connector.

According to some embodiments, a height of the mating surface 102 may be different from the height H2 of the ledge or contact surface 100*a*, resulting in an elongated ledge wall 100*d*. The contact surface 100*a* and the ledge wall 100*d* may form a relief structure configured to nest with a corresponding relief structure of a mating connector when the receptacle connector 1 is mated with the mating connector.

Figure 9:
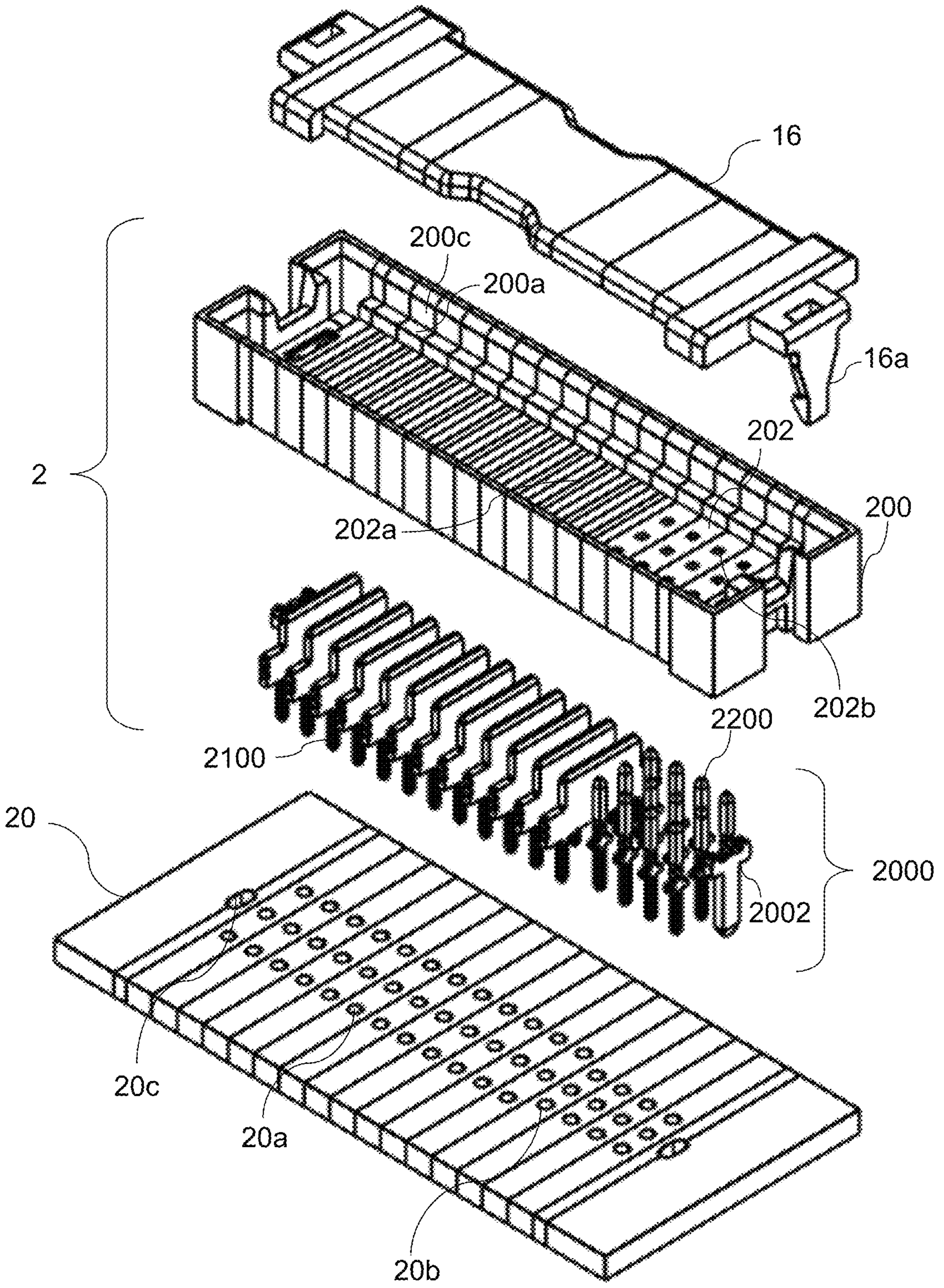
FIG. 9 is a top rear perspective view of the plug connector of FIG. 1, in a partially disassembled state, together with a plug substrate and an exemplary embodiment of a plug cap.

Turning now to the plug connector 2, FIG. 9 shows the plug connector 2 in a partially disassembled state, according to some embodiments. The plug connector 2 may be constructed with materials and techniques similar to those used for the receptacle connector 1, although the components of plug connector 2 may be shaped complementarily to the components of receptacle connector 1 so that the two connectors 1, 2 mate. In some embodiments, a removable plug cap 16 may be used to protect a portion of the connector 2 when not in use and/or to provide a flat upper surface that may be grasped by or pressed on by manufacturing equipment during the manufacture of the connector and/or mounting of it to a substrate. A plurality of latch portions 16*a* may be provided on the cap 16 and configured to latch with the connector 2. For example, the latch portions 16*a* may be provided on opposite ends of the cap 16. The connector 2 may be comprised of an insulative housing 200 and a plurality of terminals 2000 disposed at least partially in the housing 200. In some embodiments, the terminals 2000 may be comprised of power terminals 2100 and signal terminals 2200. The connector 2 may also include hold downs 2002. The power terminals 2100 and the signal terminals 2200 may be formed of metal or another material having high conductivity. As with hold downs 1002, the hold downs 2002 may be formed of metal or a hard plastic or another material having high stiffness, and may similarly be attached to a substrate (e.g., the substrate 20). The terminals 2000 may have mounting ends configured to mount to the substrate 20. In some embodiments, the mounting ends of the terminals 2000 may be configured to extend through holes 20*a*, 20*b*, 20*c* in the substrate 20 and may be fixedly attached to the substrate 20 by, e.g., soldering. In some embodiments, contact portions of the power terminals 2100 and contact portions of the signal terminals 2200 may be exposed through contact openings 202*a*, 202*b* in a mating surface 202 of the housing 200.

Figure 10A:
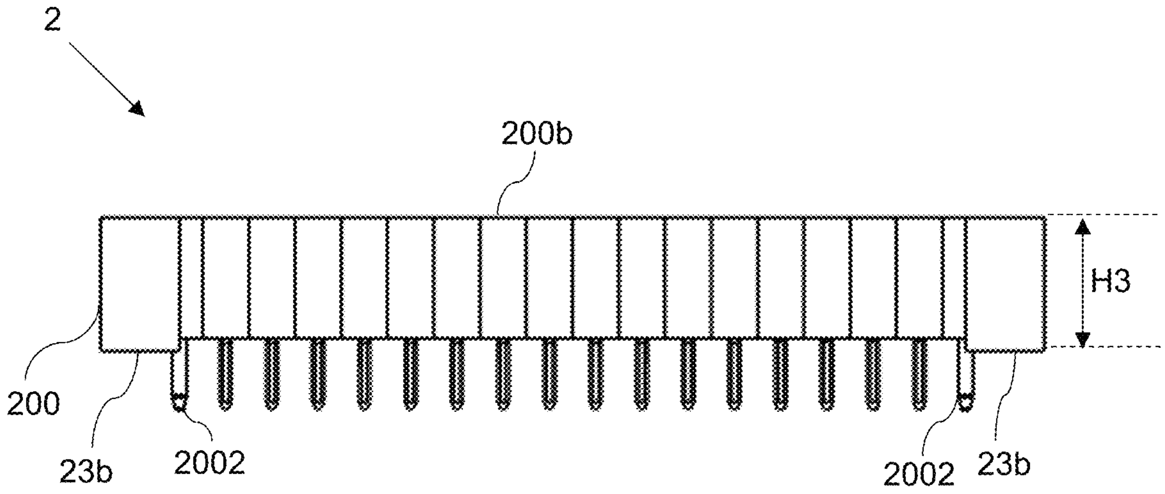
FIGS. 10A and 10B are a side elevational view and a top plan view, respectively, of the plug connector of FIG. 2.
Figure 10B:
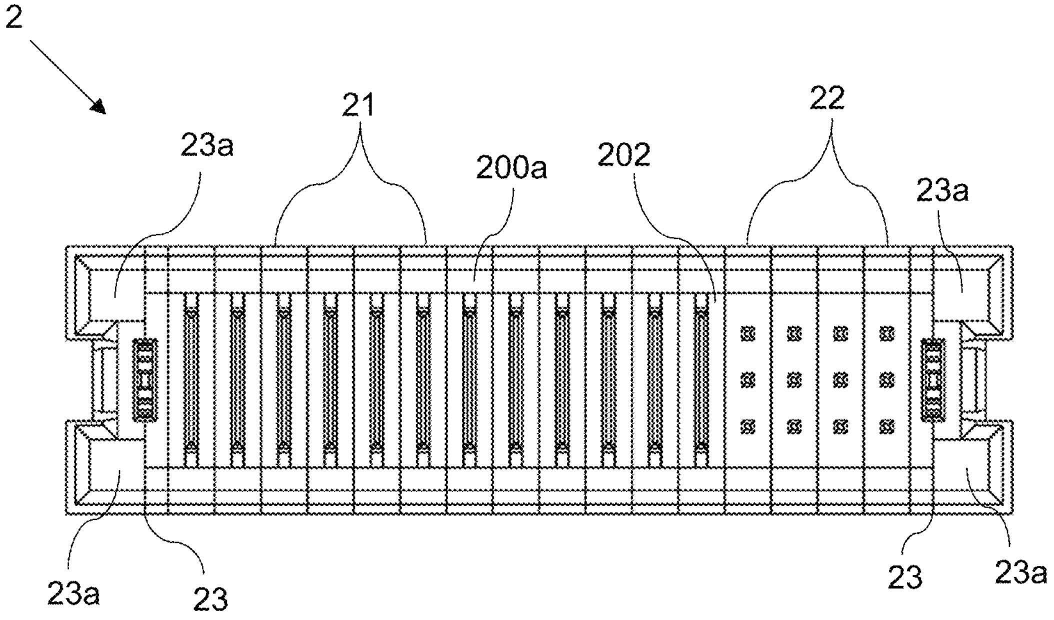

FIG. 10A shows a side elevational view of the plug connector 2, and FIG. 10B shows a plan view of a top of the connector 2, according to some embodiments. In some embodiments, the connector 2 may be comprised of a plurality of power segments 21, a plurality of signal segments 22, and a plurality of end segments 23, discussed below. The end segments 23 may be disposed on opposite ends of the connector 2, such that the power segments 21 and the signal segments 22 may be disposed between the end segment 23. In some embodiments, the power segments 21 may be grouped together and the signal segments 22 may be grouped together, as shown. In some other embodiments, the power segments 21 may be interspersed with the signal segments 22. Optionally, one or more spacer segments (not shown) may be used to separate the power segments 21 from the signal segments 22.

According to some embodiments, each of the end segments 23 may be comprised of a plurality of recesses 23*a* extending below a height of the mating surface 202, as discussed below. The recesses 23*a* may be mating recesses configured to receive corresponding mating posts (e.g., the projections 13*a*) of a mating connector (e.g., the receptacle connector 1) when that mating connector is in a mated position with the plug connector 2. For example, a pair of recesses 23*a* may be located on opposite ends of each of the end segments 23 and may be used to properly align a mating connector with the connector 2.

According to some embodiments, the housing 200 may contact the substrate 20 at mounting surfaces 23*b* of the end segments 23. In some embodiments, the housing 200 may have a height H3 that extends perpendicularly from a height of an outer edge 200*b* of the housing 200 to a height of the mounting surface 23*b*, as shown in FIG. 10A. The mating height of plug connector 2 may be defined as the distance between substrate 20 to which plug connector 2 is mounted and the same datum used to determine mating height of a mating receptacle connector 1. In the illustrated embodiment, a mating height of the plug connector 2 may correspond to the height H3 of the housing 200 and may be in a range of 2 mm to 8 mm. For example, the mating height H3 may be 2.50 mm, or 3.50 mm, or 5.50 mm, or 7.50 mm.

In some embodiments, a sum of the mating height H2 of the receptacle connector 1 and the mating height H3 of the plug connector 2 may be the stack height of the mated pair of the connectors 1, 2. For example, the stack height of the mated pair of connectors 1, 2 may be 8.00 mm, corresponding to H2=5.50 mm and H3=2.50 mm. In some embodiments, however, a connector system may be provided with connectors that have terminals with similar mating properties, but with different heights such that connectors, whether configured as a plug or receptacle, may be implemented in different mating heights, and such that, by selecting connectors of different mating heights, a relatively large range of stack heights, with fine-grained resolution may be created. Variations of the plug connector 2, for example, may be formed in mating heights of 2.5, 3.5, 5.5, or 7.5 mm. Variations of the receptacle connector 1, for example, may be formed in mating heights of 5.5, 7.5, 9.5 and 1.5 mm. These heights may be combined to form connector pairs with stack heights ranging from 8.0 mm to 20.0 mm in increments of 1.0 mm. Connectors with these height variations may be made by increasing the height of the body portions of the terminals, such as the common body portions 11*c*1, 11*c*2, the bodies 1200*c*, the bodies 2200*c*, and/or the bodies 2100*c*. Variations in the body portions may be made in some embodiments without changing the mating interface characteristics.

Figure 11A:
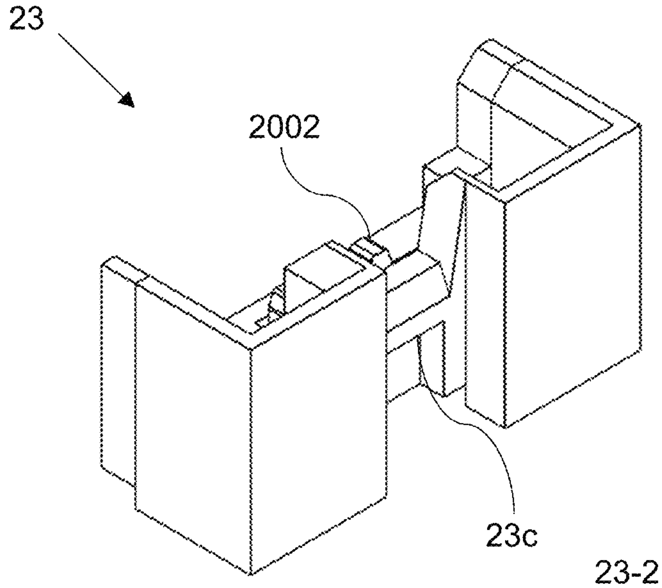
FIGS. 11A and 11B are a top front perspective view and an exploded view, respectively, of an end segment of the plug connector of FIG. 2.
Figure 11C:
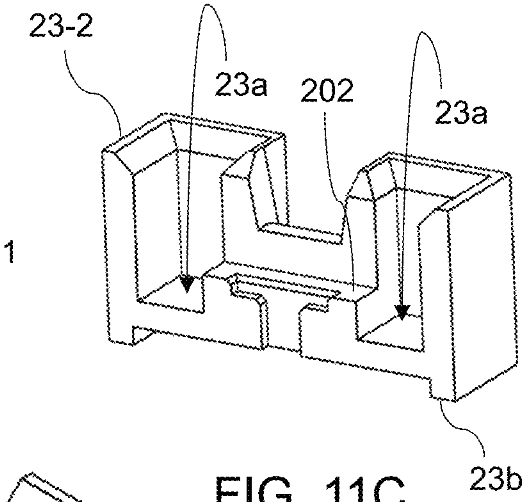
FIG. 11C is a perspective view of an internal portion of a section of the end segment.
Figure 11B:
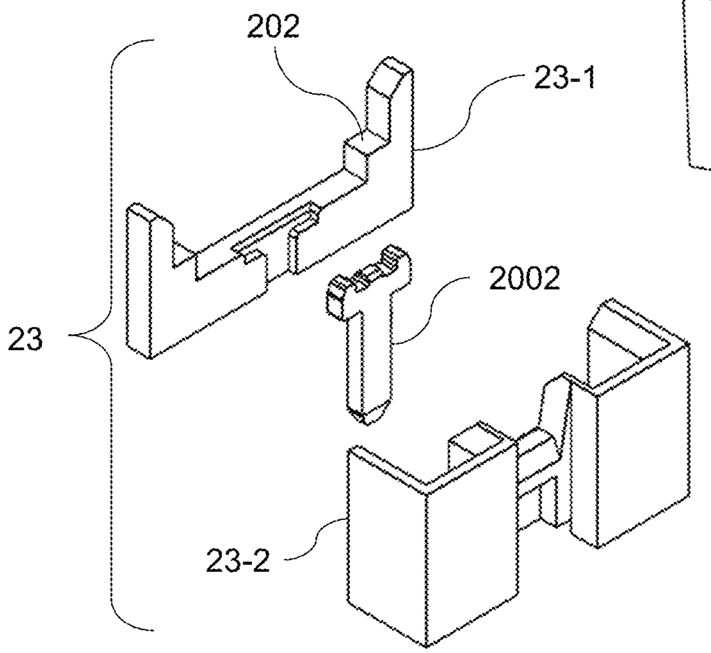

FIG. 11A shows a perspective view of the end segment 23, according to some embodiments, and FIG. 11B shows cross-sectional views of the end segment 23. The end segment 23 may be comprised of a latch portion 23*c* configured to latch with a corresponding latch portion (e.g., the latch portion 16*a*) of the cap 16. In some embodiments, the end segment 23 may be comprised of a first end portion 23-1 and a second end portion 23-2 that, when joined together, form a recess shaped to accommodate a portion of the mounting terminal 2002, which may function similarly to the mounting terminal 1002 of the receptacle connector 1 discussed above. Alternatively, the end segment 23 may be formed as a unitary member separate from other segments of the connector or may be integrally formed with one or more other segments of the connector.

FIG. 11C shows a perspective view of an internal portion of the second end portion 23-2 of the end segment 23, according to some embodiments. As discussed above, the second end portion 23-2 may be comprised of a pair of recesses 23*a* having a height that is lower than a height of the mating surface 202. With such a structure, when a mating connector (e.g., the receptacle connector 1) is properly mated with the plug connector 2, corresponding mating posts (e.g., the projections 13*a*) of the mating connector may be seated in the recesses 23*a* on opposite ends of the housing 200 of the connector 2, and the mating surface 202 of the connector 2 may face a corresponding mating surface (e.g., the mating surface 102) of the mating connector.

Figure 12A:
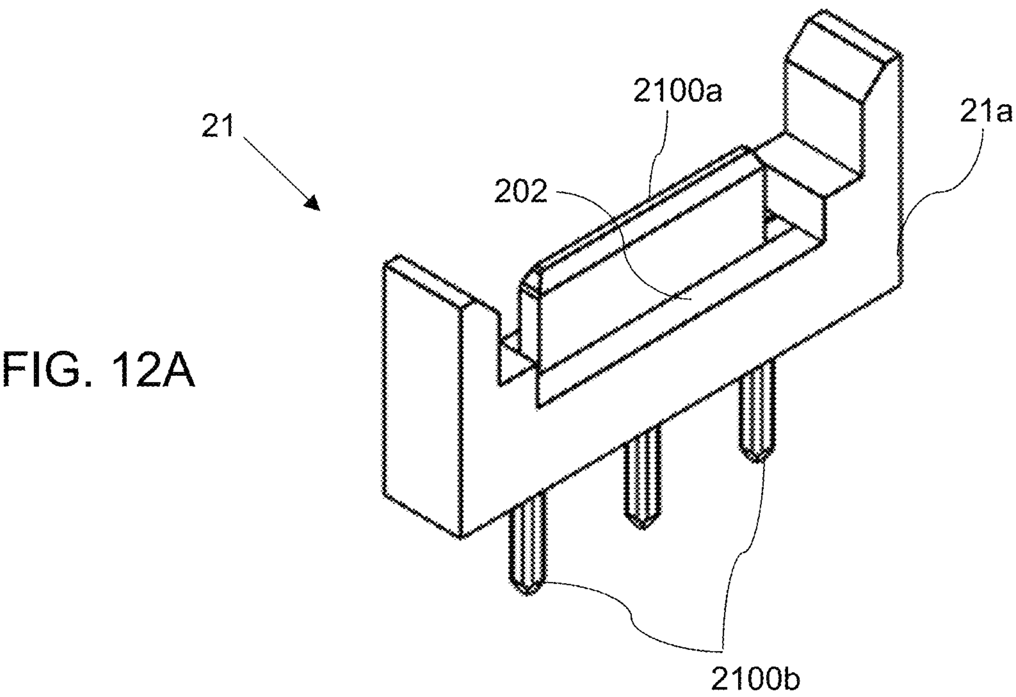
FIGS. 12A and 12B are a top perspective view and an exploded view, respectively, of a power segment of the plug connector of FIG. 2.
Figure 12B:
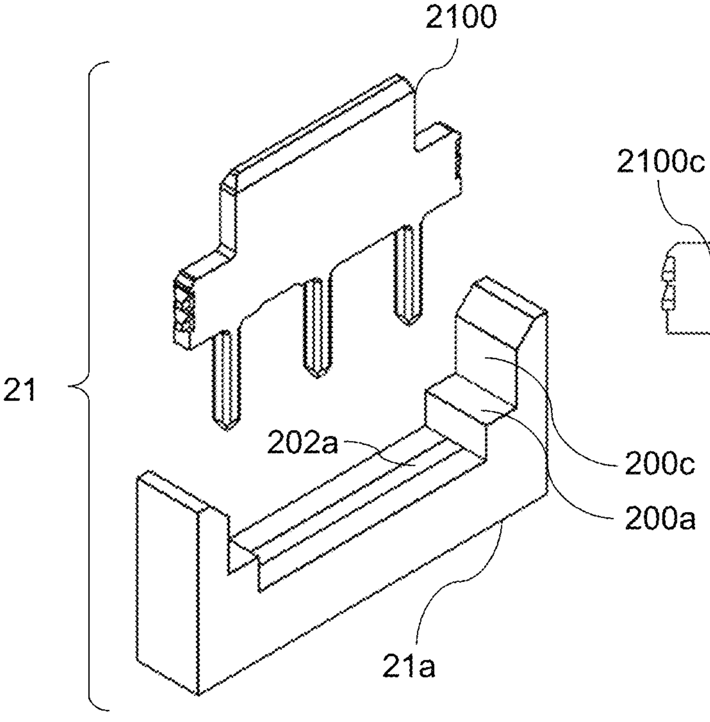
Figure 13:
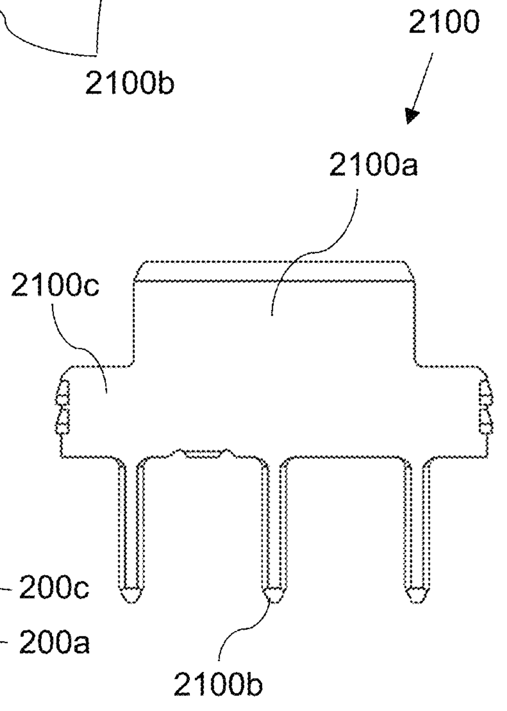
FIG. 13 is a front view of an exemplary embodiment of a power terminal of the plug connector of FIG. 2.

FIG. 12A shows a top perspective view of the power segment 21, according to some embodiments, and FIG. 12B shows an exploded view of the power segment 21. In some embodiments, each of the power segments 21 may be comprised of a housing portion 21*a* and a power terminal 2100 fixed to the housing portion 21*a*. FIG. 13 shows an elevational view of a front of the power terminal 2100, according to some embodiments. The power terminal 2100 may be comprised of a tab 2100*a* extending in a first direction from a body 2100*c* and through a contact opening 202*a* of the housing portion 21*a*, such that an end of the power tab 2100*a* is positioned outside of the housing portion 21*a*. In some embodiments, the power tab 2100*a* may extend beyond the mating surface 202 of the plug connector 2 and may be configured to contact a corresponding power terminal physically and electrically (e.g., the power terminal 1100) of a mating connector (e.g., the receptacle connector 1) when the mating connector and the plug connector 2 are mated together. The power terminal 2100 also may be comprised of a plurality of mounting legs 2100*b* extending in a second direction from the body 2100*c*. The mounting legs 2100*b* may be configured to extend beyond an outer surface of the housing portion 21*a* for mounting to the substrate 20. In some embodiments, the mounting legs 2100*b* may be configured to extend through the holes 20*a* of the substrate 20.

Figure 14A:
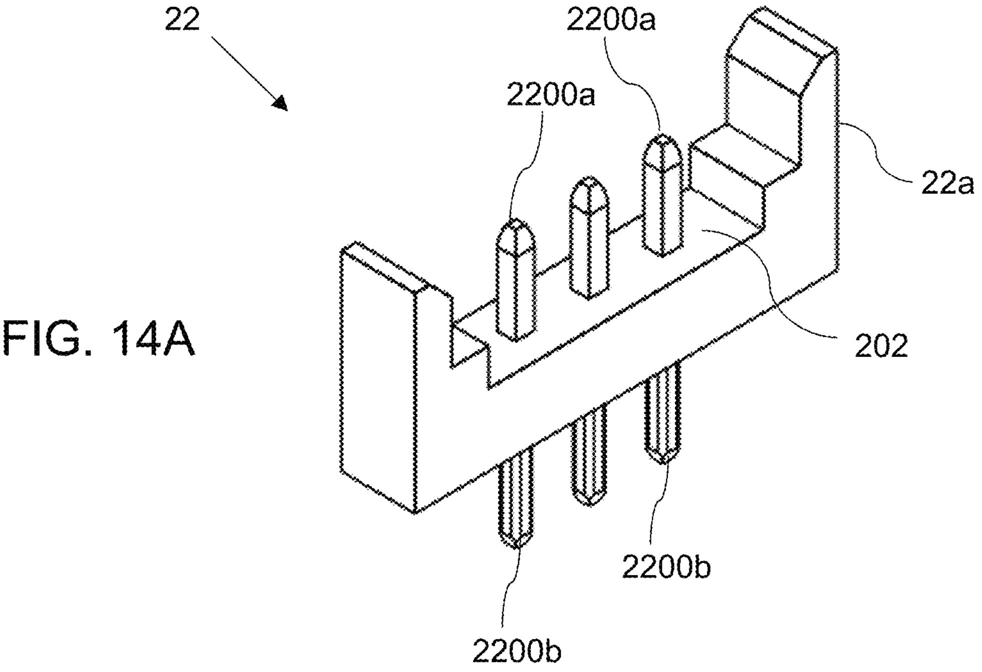
FIGS. 14A and 14B are a top perspective view and an exploded view, respectively, of a signal segment of the plug connector of FIG. 2.
Figure 14B:
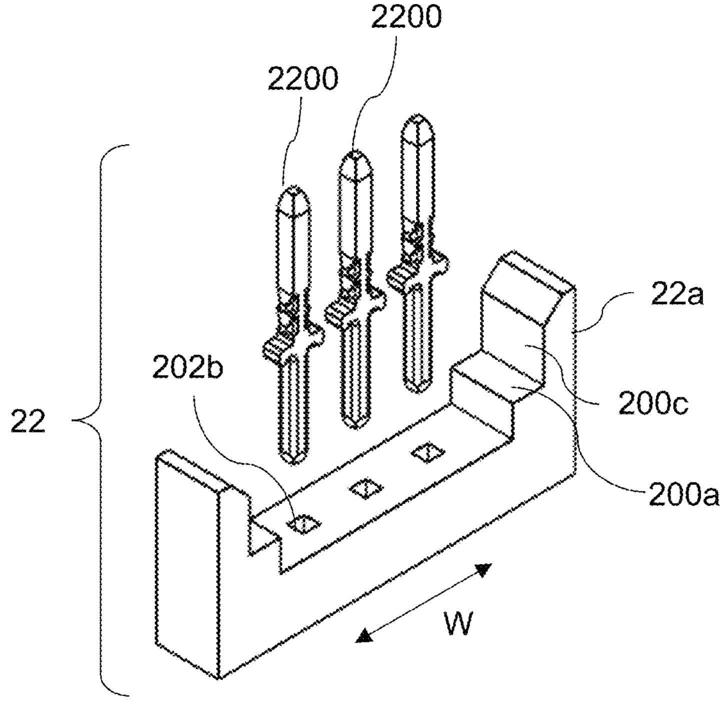

FIG. 14A shows a perspective view of the signal segment 22, according to some embodiments, and FIG. 14B shows an exploded view of the signal segment 22. In some embodiments, each of the signal segments 22 may be comprised of a housing portion 22*a* and a plurality of signal terminals 2200 fixed to the housing portion 22*a*. In the example shown in FIGS. 14A and 14B, a row of three signal terminals 2200 are disposed in the width direction W of the signal segment 22.

Figure 15:
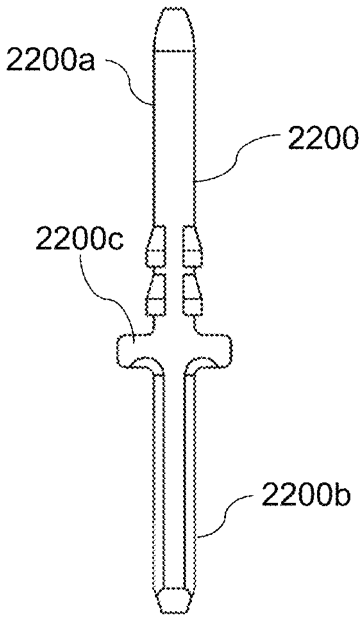
FIG. 15 is a front view of a signal terminal of the plug connector of FIG. 2.

FIG. 15 shows an elevational front view of the signal terminal 2200, according to some embodiments. The signal terminal 2200 may be comprised of a pin 2200*a* extending in the first direction from a body 2200*c* and through a contact opening 202*b* of the housing portion 22*a*, such that an end of the pin 2200*a* is positioned outside of the housing portion 22*a*. In some embodiments, the pin 2200*a* may extend beyond the mating surface 202 of the plug connector 2 and may be configured to contact a corresponding signal terminal physically and electrically (e.g., the signal terminal 1200) of a mating connector (e.g., the receptacle connector 1) when the mating connector and the plug connector 2 are mated together. The signal terminal 2200 also may be comprised of a mounting leg 2200*b* extending in the second direction from the body 2200*c*. The mounting leg 2200*b* may be configured to extend beyond an outer surface of the housing portion 22*a* for mounting to the substrate 20. In some embodiments, the mounting leg 2200*b* may be configured to extend through the holes 20*b* of the substrate 20.

According to some embodiments, a height of the mating surface 202 may be lower than a height of a ledge or contact surface 200*a* locate on opposite sides of the mating surface 202, and the height of the contact surface 200*a* may be lower than a height of the outer edge 200*b* of the housing 200. The contact surface 200*a* and an adjacent wall 200*c* may form a relief structure configured to nest with a corresponding relief structure of a mating connector (e.g., the receptacle connector 1) when the plug connector 2 is mated with the mating connector. For example, the mating surface 200*a* of the connector 2 may be configured to face the mating surface 100*a* of the connector 1 such that an edge of the mating surface 100*a* is located at a corner formed by the mating surface 200*a* and the adjacent wall 200*c*.

Figure 16:
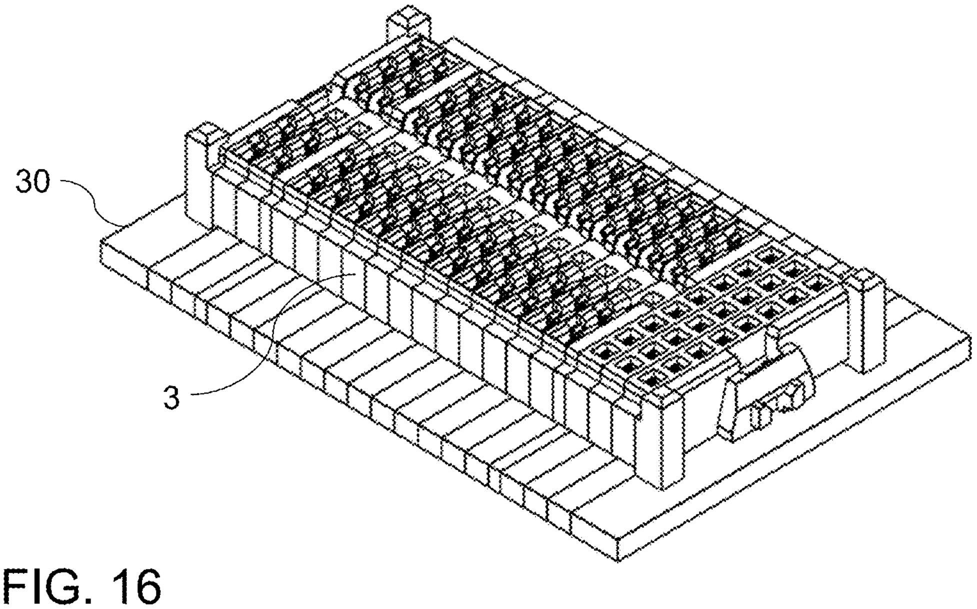
FIG. 16 is a top front perspective view of an alternative embodiment of a receptacle connector.
Figure 17:
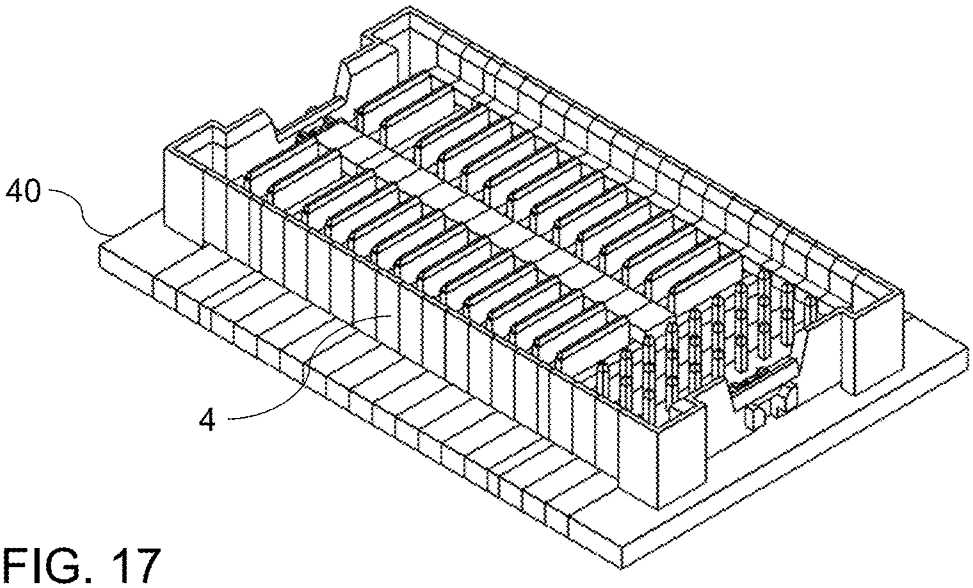
FIG. 17 is a top rear perspective view of an alternative embodiment of a plug connector.

For some applications, it may be advantageous to have a multi-function connector that is able to pass multiple signals as well as power at two or more different voltage levels. Such versatility may result in a reduction in the number of connectors used in an electronic device and therefore may allow the electronic device to be miniaturized. FIG. 16 depicts an example of a receptacle connector 3 mounted to a substrate 30 that may be used for such applications, according to some embodiments. FIG. 17 depicts an example of a plug connector 4 mounted to a substrate 40 that may be mated to the connector 1, according to some embodiments of the present technology. The receptacle connector 3 and the plug connector 4 may have segments, corresponding to rows of the connector, constructed using techniques as described above for the receptacle connector 1 and the plug connector 2. The receptacle connector 3 and the plug connector 4, however, may include rows with two contact portions per row. These contact portions may be electrically connected together within the connector or may be electrically separate within the connector.

In the illustrated embodiments, one or both of the substrates 30, 40 may be a PCB comprised of electrical wiring formed on and/or within the PCB. In some embodiments, the connectors 3, 4 may be mezzanine connectors that, when mated together, have a stack height determined by respective mating heights of the connectors 3, 4. For example, the stack height may be a perpendicular distance between the substrate 30 and the substrate 40 when the connectors 3, 4, are mated together. In some embodiments, the stack height of the connectors 3, 4 may be in a range of 8.00 mm to 20.00 mm. Many features of the receptacle connector 3 may be the same as or similar to the receptacle connector 1, discussed above, as can be seen by a comparison of their drawings, and therefore description of some of those features will not be repeated in the description of the connector 3. Similarly, many features of the plug connector 4 may be the same as or similar to features of plug connector 2, discussed above, as can be seen by a comparison of their drawings, and therefore description of some of those features will not be repeated in the description of the connector 4. The similar features may include mating heights and stack heights, for example.

Figure 18:
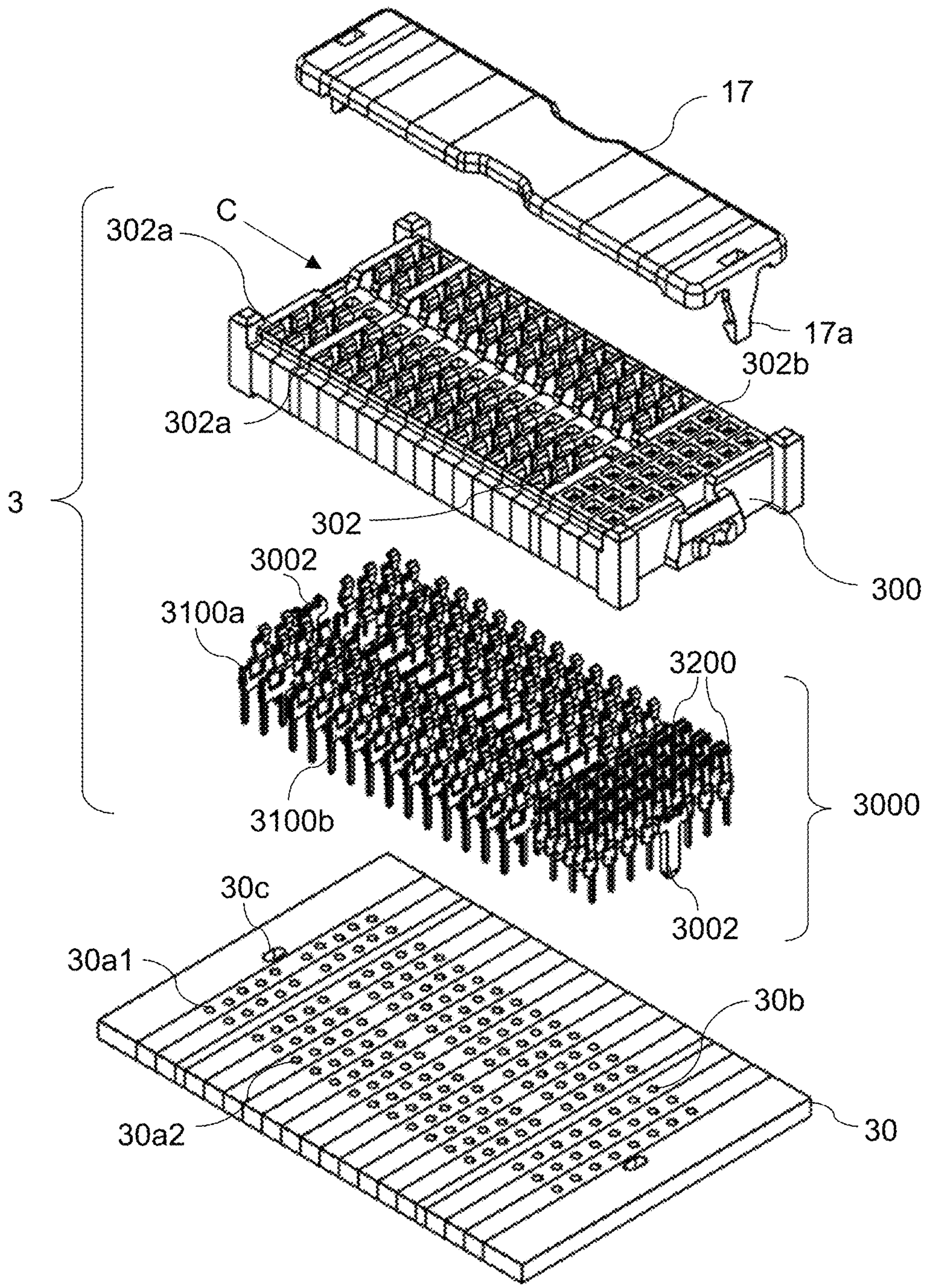
FIG. 18 is a top front perspective view of the receptacle connector of FIG. 16, in a partially disassembled state, together with exemplary embodiments of a receptacle substrate and a receptacle cap.

FIG. 18 shows the receptacle connector 3 in a partially disassembled state, according to some embodiments. In some embodiments, a removable cap 17 may be used to protect a portion of the connector 3 when not in use. A plurality of latch portions 17*a* may be provided on the cap 17 and configured to latch with the connector 3. For example, the latch portions 17*a* may be provided on opposite ends of the cap 17. The connector 2 may be comprised of an insulative housing 300 and a plurality of terminals 3000 disposed at least partially in the housing 300. In some embodiments, the terminals 3000 may be comprised of power terminals 3100*a*. 3100*b*, signal terminals 3200, and hold downs 3002. The terminals 3000 may have mounting legs configured to extend through holes 30*a*, 30*b*, 30*c* in the substrate 30 and may be to fixedly attached to the substrate 30 by, e.g., soldering. In some embodiments, contact portions of the power terminals 3100*a*, 3100*b* and contact portions of the signal terminals 3200 may be exposed through contact openings 302*a*, 302*b*, 302*c* in a mating surface 302 of the housing 300. The mating surface 302 may be configured to face a corresponding mating surface of a mating connector (e.g., the plug connector 4) when the connector 3 and the mating connector are in a mated position.

Figure 19A:
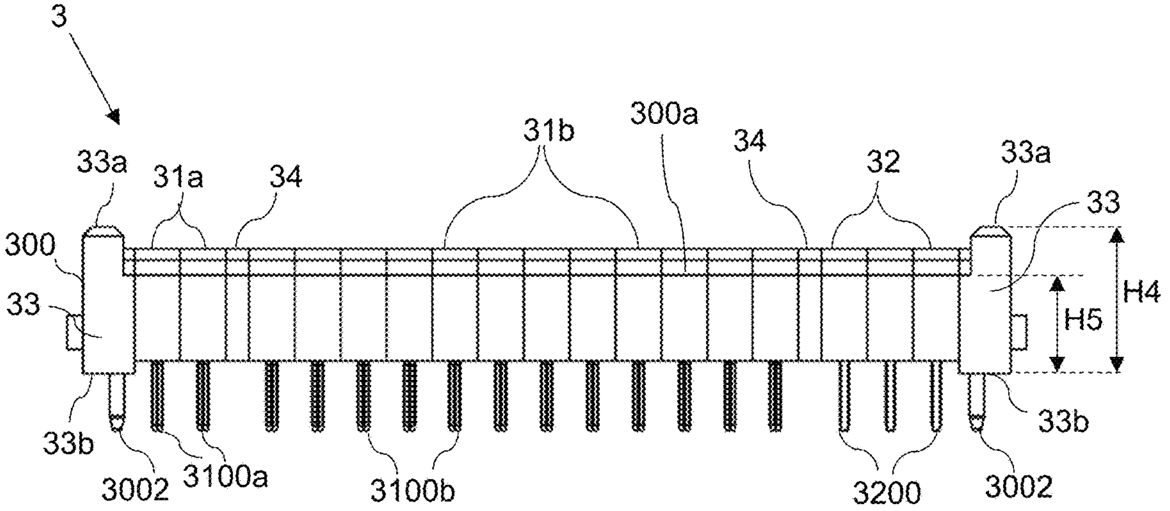
FIGS. 19A and 19B are a side view and a top plan view, respectively, of the receptacle connector of FIG. 16.
Figure 19B:
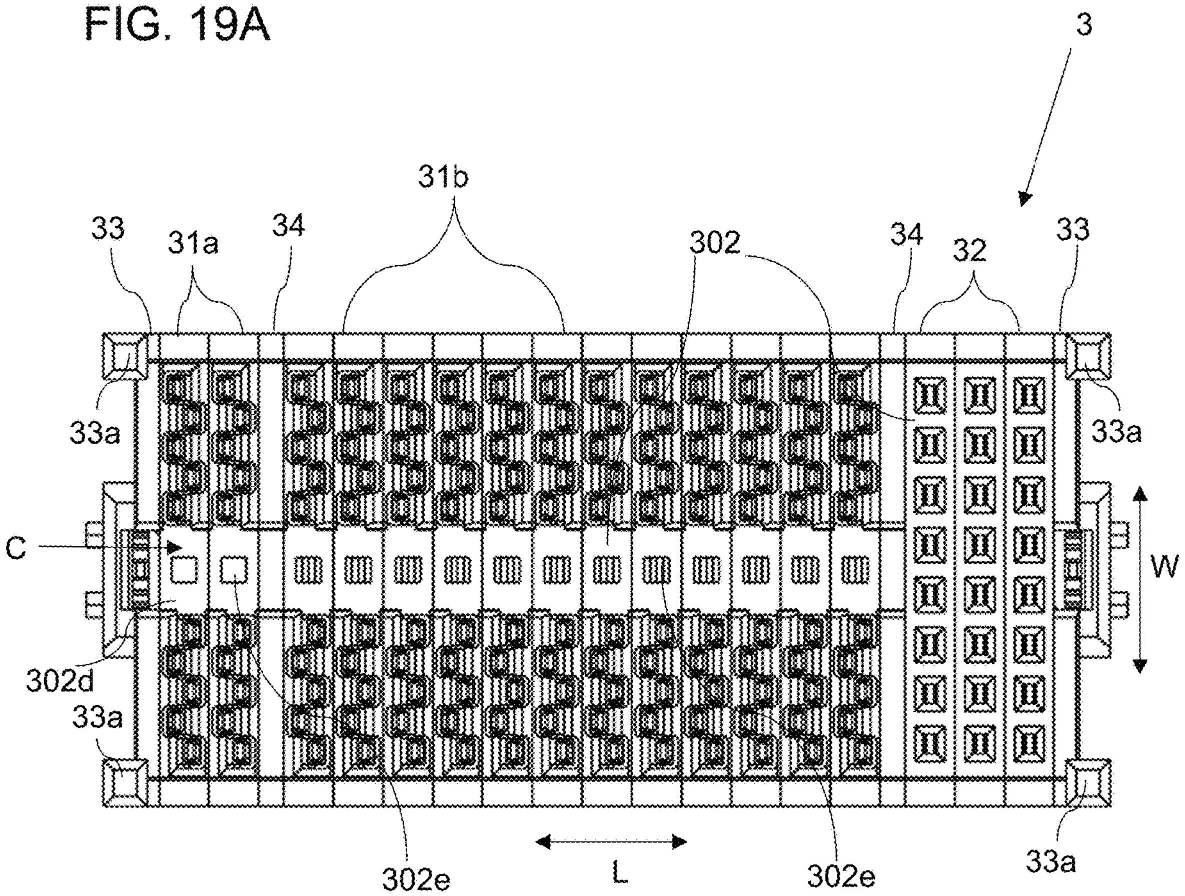

FIG. 19A shows an elevational view of a side of the receptacle connector 3 and FIG. 19B shows a plan view of a top side of the connector 3, according to some embodiments. In some embodiments, the connector 3 may be comprised of a plurality of first power segments 31*a*, a plurality of second power segments 31*b*, a plurality of signal segments 32, and a plurality of end segments 33, discussed below. The end segments 33 may be disposed on opposite ends of the connector 3, such that the first and second power segments 31*a*, 31*b* and the signal segments 32 may be disposed between the end segments 33. In some embodiments, the first power segments 31*a* may be grouped together, the second power segments 31*b* may be grouped together, and the signal segments 32 may be grouped together, as shown. In some other embodiments, the first and second power segments 31*a*, 31*b* may be interspersed with the signal segments 32. In some embodiments, a spacer segment 34, which may not contain a terminal, may be used to separate the first and second power segments 31*a*, 31*b* from the signal segments 32. In some embodiments, another spacer segment 34 may be used to separate the first power segments 31*a* from the second power segments 31*b*.

According to some embodiments, each of the end segments 33 may be comprised of a plurality of projections 33*a* extending in a direction away from a mounting surface 33*b*. The projections 33*a* may be mating posts configured to be received in corresponding recesses in a mating connector (e.g., the plug connector 4) when the mating connector is in a mated position with the receptacle connector 3. For example, a pair of projections 33*a* may be located on opposite ends of each of the end segments 33 and may be used to properly align a mating connector with the connector 3. In some embodiments, tips of the projections 33*a* may be beveled to facilitate seating of the projections 33*a* in corresponding recesses in a mating connector.

According to some embodiments, the housing 300 may contact the substrate 30 at the mounting surfaces 33*b* of the end segments 33. In some embodiments, the housing 300 may have a maximum height H4 that extends perpendicularly from a height of an outer edge of the projection 33*a* to a height of the mounting surface 33*b*, as shown in FIG. 19A. A mating height H5 of the receptacle connector 3 may be less than the maximum height H4 and may be a perpendicular distance from the mounting surface 33*b* of at least one of the end segments 33 to a datum on a mated pair of connectors used to define the mounting height of both mated connectors. In some embodiments, the mating height H4 may be in a range of 5 mm to 12 mm, such as 5.50 mm, or 7.50 mm, or 9.50 mm, or 11.50 mm.

Figure 20A:
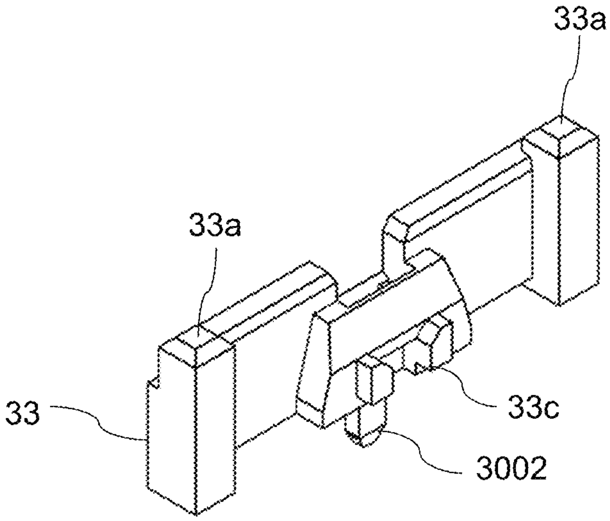
FIGS. 20A and 20B are a top front perspective view and an exploded view, respectively, of an end segment of the receptacle connector of FIG. 16.
Figure 20B:
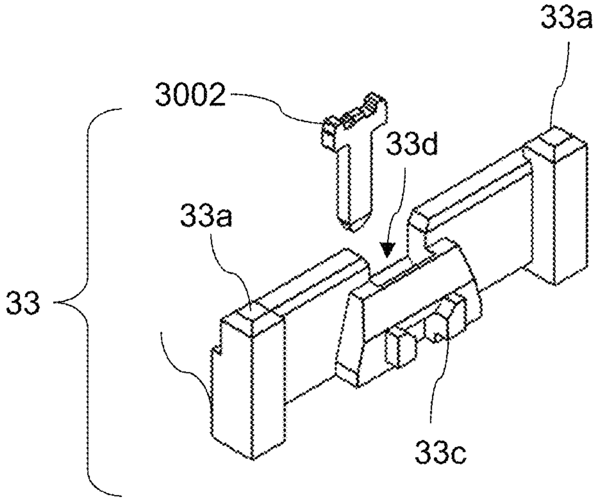

FIG. 20A shows a top perspective view of the end segment 33, according to some embodiments, and FIG. 20B shows an exploded view of the end segment 33. The end segment 33 may be comprised of a latch portion 33*c* configured to latch with a corresponding latch portion (e.g., the latch portion 16*a*) of the cap 16. The end segment 33 may be comprised of an opening 33*d* through which the mounting terminal 3002 may be inserted and/or adjusted. In some embodiments, the opening 33*d* may be a through-hole 33*d*, such that the mounting end of the hold down 3002 may extend through a mounting end of the through-hole 33*d*. For example, in some embodiments, the hold down 3002 may be comprised of shoulders configured to abut against ledges on an internal surface of the through-hole 33*d*. When the end segments 33 are mounted to the substrate 30, the hold downs 3002 may serve to hold opposite ends of the receptacle connector 3 against the substrate 30.

Figure 21A:
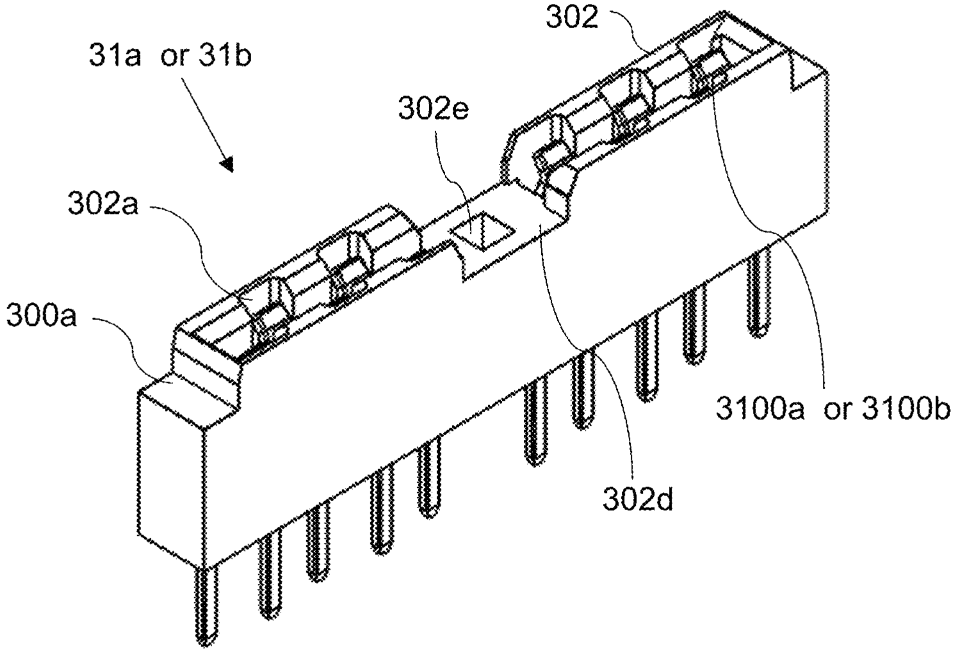
FIGS. 21A and 21B are a top perspective view and a front elevational view, respectively, of a first power segment or a second power segment of the receptacle connector of FIG. 16.
Figure 21B:
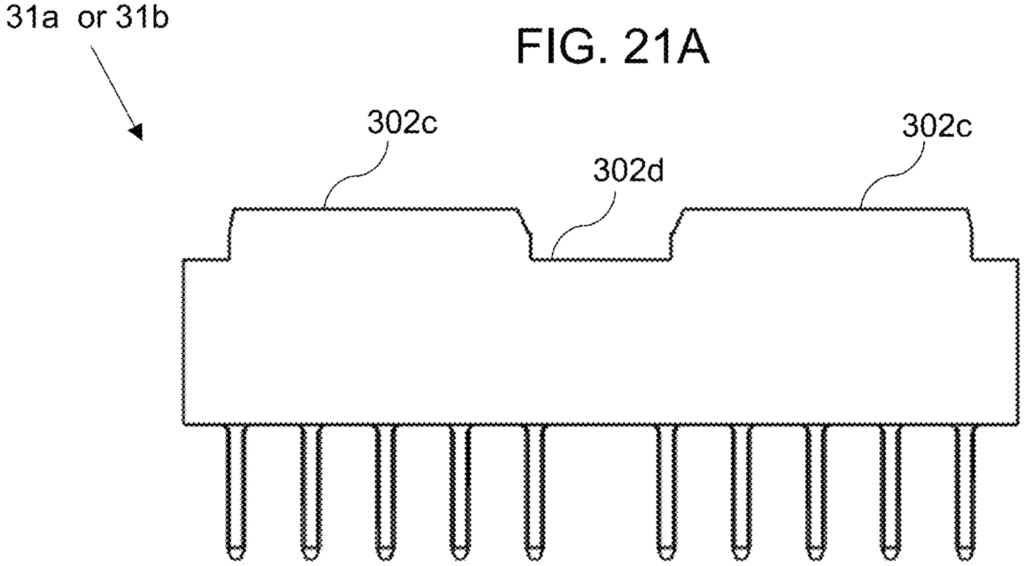

FIGS. 21A and 21B show a perspective view and an elevational view, respectively, of the first power segment 31*a* or the second power segment 31*b*, according to some embodiments. Each of the first and second power segments 31*a*, 31*b* may have the same appearance in these views. Internally, however, the first and second power segments 31*a*, 31*b* may be different front each other, as discussed herein. In some embodiments, at each of the first and second power segments 31*a*, 31*b*, the mating surface 302 may be contoured and may be comprised of a plurality of contact regions 302*c* separated by a separation region 302*d*, which may be recessed relative to the contact regions 302*c*. The contact openings 302*a* of the first and second power segments 31*a*, 31*b* may be located in the contact regions 302*c*. As shown in FIGS. 18 and 19B, the separation regions 302*d* of the first and second power segments 31*a*, 31*b* of the receptacle connector 3 may be aligned, and the pairs of contact regions 302*c* of the first and second power segments 31*a*, 31*b* of the connector 3 may be aligned, such that the connector 3 may have a channel C that extends along a length direction L and that separates parallel columns of contact regions 302*c*. In some embodiments, the channel C may be centrally located midway along a width direction W. In some embodiments, the channel C may be configured to receive a corresponding raised rib of a mating connector (e.g., a rib formed by separation regions 402*d* of the plug connector 4) when the connector 3 and the mating connector are in a mated position. In some embodiments, each of the contact regions 302*c* of the first and second power segments 31*a*, 31*b* may be configured to receive a corresponding power tab of the mating connector when the connector 3 and the mating connector are in the mated position.

In FIG. 21B, a single separation region 302*d* is disposed between two contact regions 302*c*. However, in other embodiments, the receptacle connector 3 may be comprised of more than one separation region 302*d* separating more than two contact regions 302*c* (e.g., three contact regions 302*c* separated from each other by two separation regions 302*d*).

Figure 22A:
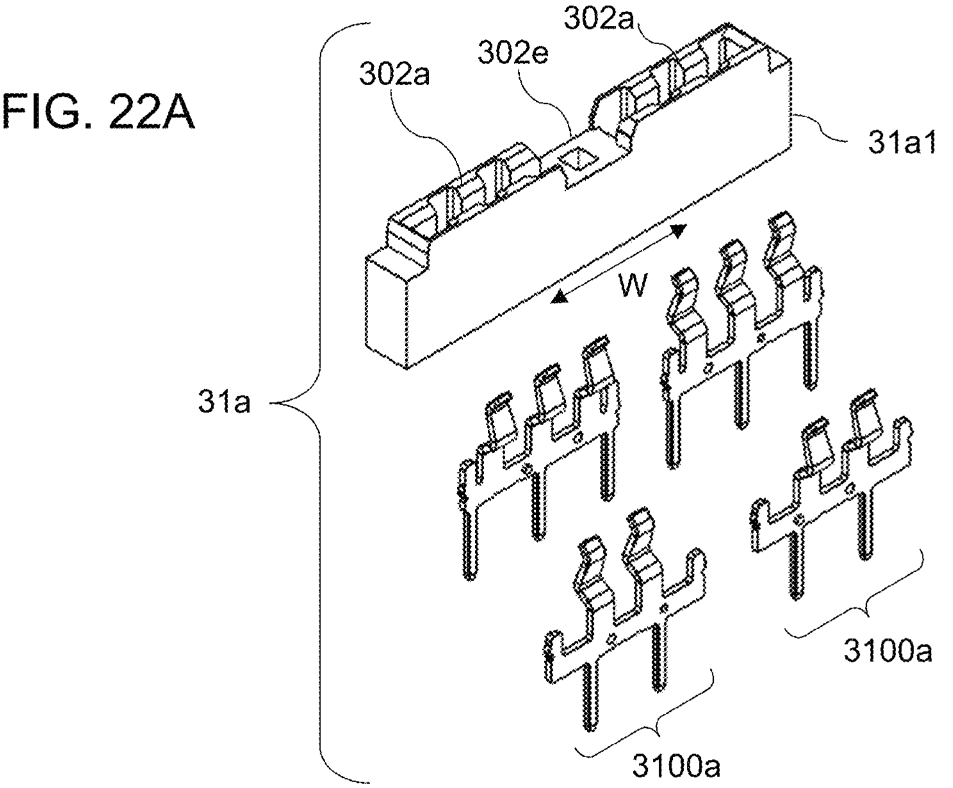
FIGS. 22A and 22B are exploded views of the first power segment and the second power segment, respectively, of FIG. 21A.

FIG. 22A shows an exploded perspective view of the first power segment 31*a*, according to some embodiments. In some embodiments, the first power segment 31*a* may be comprised of a housing portion 31*a*1 and multiple first power terminals 3100*a* fixed to the housing portion 31*a*1.

The first power terminals 3100*a* may be disposed in a row along a width direction W. In this example, the contact openings 302*a* and 302*b* may be separated, with a wall in the housing portion in separation region 302*d* electrically isolating them.

Figure 23A:
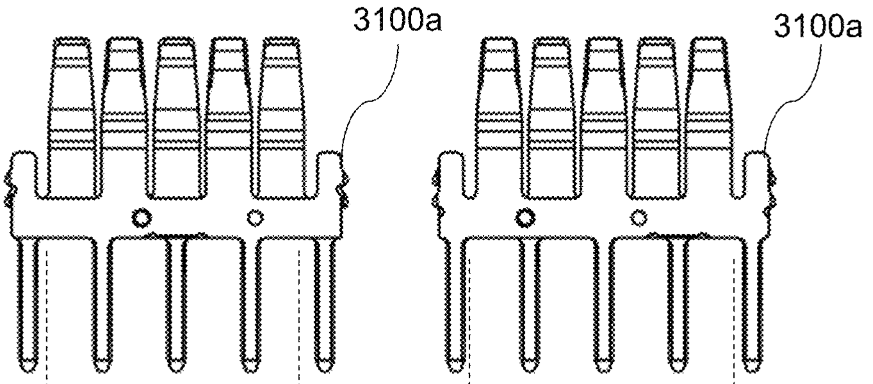
FIG. 23A is a front view of an exemplary embodiment of a first power terminal.

FIG. 23A shows an elevational view of a front of the first power terminals 3100*a* of the first power segment 31*a*. Each of the first power terminals 3100*a* may be comprised of a set of interdigitated contact fingers and may be similar in structure to the power terminal 1100, discussed above, and therefore details regarding the structure of each of the first power terminals 3100*a* will not be repeated.

In FIGS. 22A and 23A, a pair of first power terminals 3100*a* are shown. It should be understood, however, that in other embodiments there may be more than two first power terminals 3100*a* in the first power segment 31*a*.

Figure 22B:
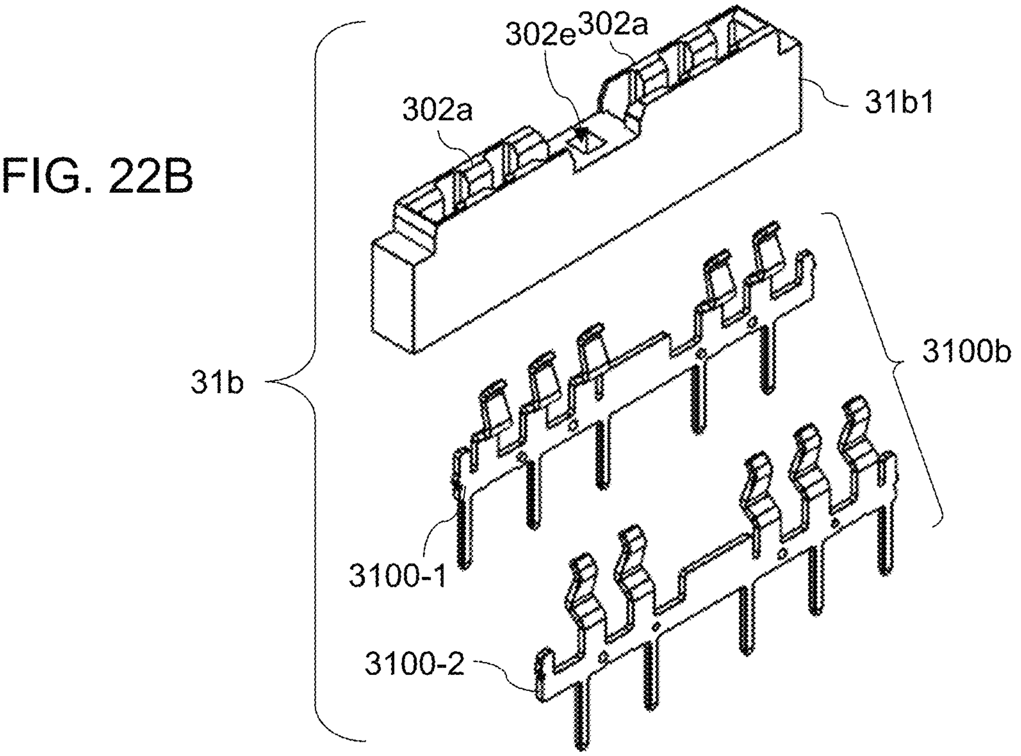

FIG. 22B shows an exploded perspective view of the second power segment 31*b*, according to some embodiments. In contrast to the segment shown in FIG. 22A, which illustrates two electrically separate contact portions in a row, the segment shown in FIG. 22B has two contact portions that are electrically connected within the connector. Accordingly, the segment of FIG. 22B is suitable for use for carrying higher current, but only one voltage level, whereas the segment shown in FIG. 22A is suitable for two voltage levels but at lower current levels per segment. In some embodiments, the second power segment 31*b* may be comprised of a housing portion 31*b*1 and a single second power terminal 3100*b* fixed to the housing portion 31*b*1. In this example, the contact openings 302*a* and 302*b* may be in communication with each other. For example, the housing portion in the separation region 302*d* may include a channel to receive a joint region 31-C.

Figure 23B:
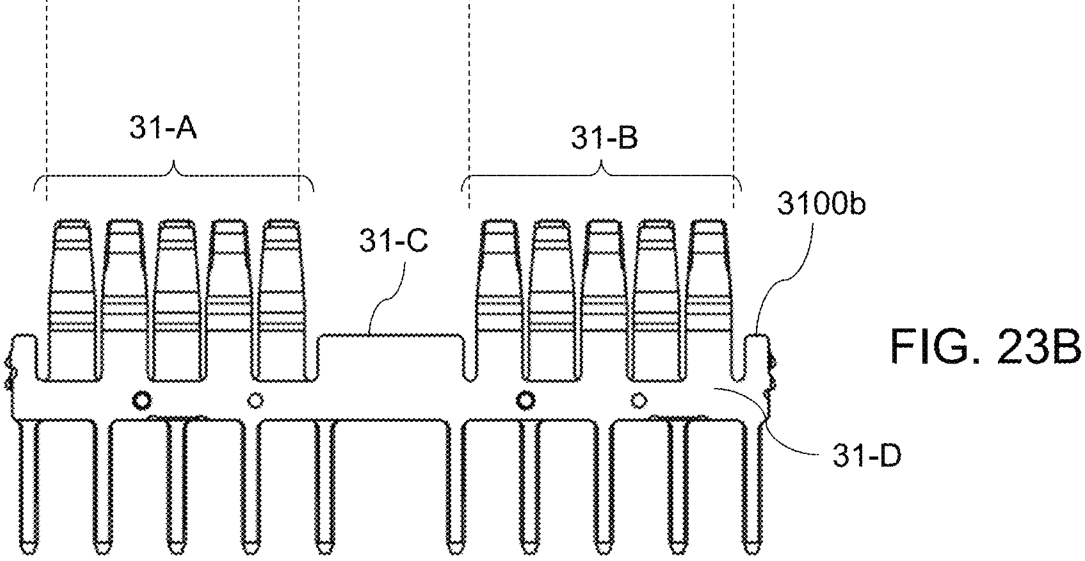
FIG. 23B is a front view of an exemplary embodiment of a second power terminal.

FIG. 23B shows an elevational view of a front of the second power terminal 3100*b*. In some embodiments, the second power terminal 3100*b* may be comprised of first and second sets of interdigitated contact fingers 31-A, 31-B, respectively, which are physically and electrically connected to each other by a joint region 31-C. The joint region 31-C may have a width such that the first and second sets of interdigitated fingers 31-A, 31-B align with the two sets of contact fingers of the two first power terminals 3100*a* of the first power segment 31*a*. The first and second sets of interdigitated fingers 31-A, 31-B may extend from a common body 31-D to the contact openings 302*a* of the second power segment 31*b*. Similar to the power terminal 1100, each of the second power terminals 3100*b* may be comprised of first and second finger plates 3100-1, 3100-2 that each are provided with fingers configured such that, when the first and second plates are brought together, the fingers are interdigitated.

According to some embodiments, a hole 302*e* in the separation region 302*d* of the first and second power segments 31*a*, 31*b* may allow the presence of the joint region 31-C in the second power segments 31*b* or the absence of such a joint region in the first power segments 31*a* to be detectable. For example, as depicted in FIG. 19B, for the second power segments 31*b*, material (e.g., metal) comprising the joint region 31-C may be visible via the hole 302*e*, whereas, for the first power segments 31*a*, no material may be visible via the hole 302*e*.

According to some embodiments, a height of the channel C of the receptacle connector 3 may be the same as the height of the contact surface 300*a*, which is the mating height H5 of the connector 3.

Figure 24A:
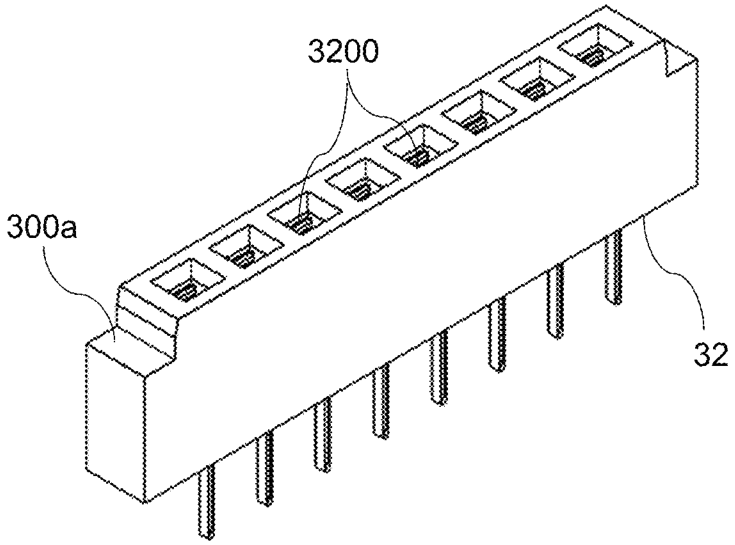
FIGS. 24A and 24B are a top perspective view and an exploded view, respectively, of a signal segment of the receptacle connector of FIG. 16.
Figure 24B:
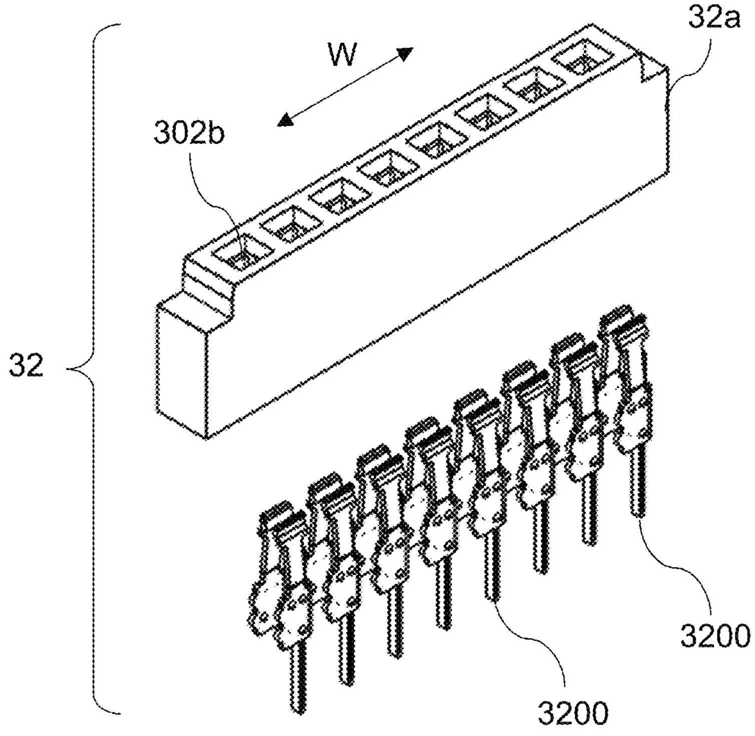

FIG. 24A shows a perspective view of the signal segment 32, according to some embodiments, and FIG. 24B shows an exploded view of the signal segment 32. In some embodiments, each of the signal segments 32 may be comprised of a housing portion 32*a* and a plurality of signal terminals 3200 fixed to the housing portion 32*a*. The signal segment 32 is here shown with the same width as the power segments 31*a*, 31*b*, enabling the signal segment 32 to have more signal terminals 3200 in a row than the signal terminal 22. In the example shown in FIGS. 24A and 24B, a row of eight signal terminals 3200 are disposed in the width direction W of the signal segment 32. In some embodiments, each signal terminal 3200 may be similar in structure to the signal terminal 1200, discussed above, and therefore details regarding the structure of the signal terminals 3200 will not be repeated.

According to some embodiments, a height of the mating surface 302 may be different from the height H5 of the ledge or contact surface 300*a*, resulting in an elongated ledge wall adjacent the contact surface 300*a*, similar to the ledge wall 100*d* discussed above. The contact surface 300*a* and the adjacent ledge wall may form a relief structure configured to nest with a corresponding relief structure of a mating connector (e.g., the plug connector 4) when the receptacle connector 3 is mated with the mating connector.

As with the receptacle connector 1, although the receptacle connector 3 is described above to have a segmented structure, in some embodiments the connector 3 may be formed with a unitary housing or may have a segmented housing.

Figure 25:
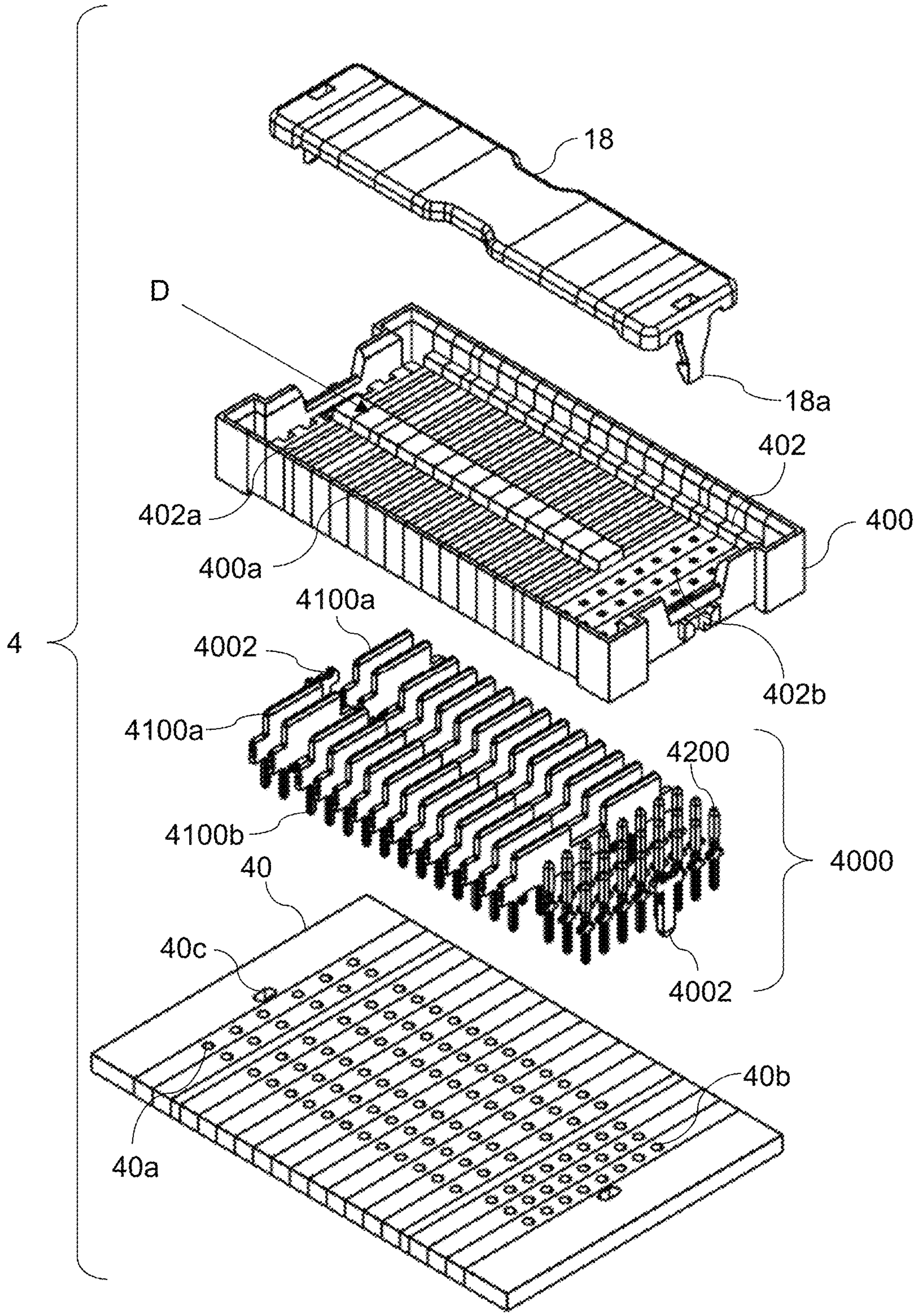
FIG. 25 is a top rear perspective view of the plug connector of FIG. 17, in a partially disassembled state, together with a plug substrate and a plug cap.

Turning now to the plug connector 4, FIG. 25 shows the plug connector 4 in a partially disassembled state, according to some embodiments. In some embodiments, a removable cap 18 may be used as described above. A plurality of latch portions 18*a* may be provided on the cap 18 and configured to latch with the connector 4. For example, the latch portions 18*a* may be provided on opposite ends of the cap 18.

The connector 4 may be comprised of an insulative housing 400 and a plurality of terminals 4000 disposed at least partially in the housing 400. In some embodiments, the terminals 4000 may be comprised of first and second power terminals 4100*a*, 4100*b* and signal terminals 4200. Hold downs 4002, which in the pictured embodiment have the same shape and function as hold downs as described above, may also be incorporated in the connector 4. The terminals 4000 may have mounting ends configured to extend through holes 40*a*, 40*b*, 40*c* in the substrate 40 and may be configured to be fixedly attached to the substrate 40 by, e.g., soldering. In some embodiments, contact portions of the first and second power terminals 4100*a*, 4100*b* and contact portions of the signal terminals 4200 may be exposed through contact openings 402*a*, 402*b* in a mating surface 402 of the housing 400.

Figure 26A:
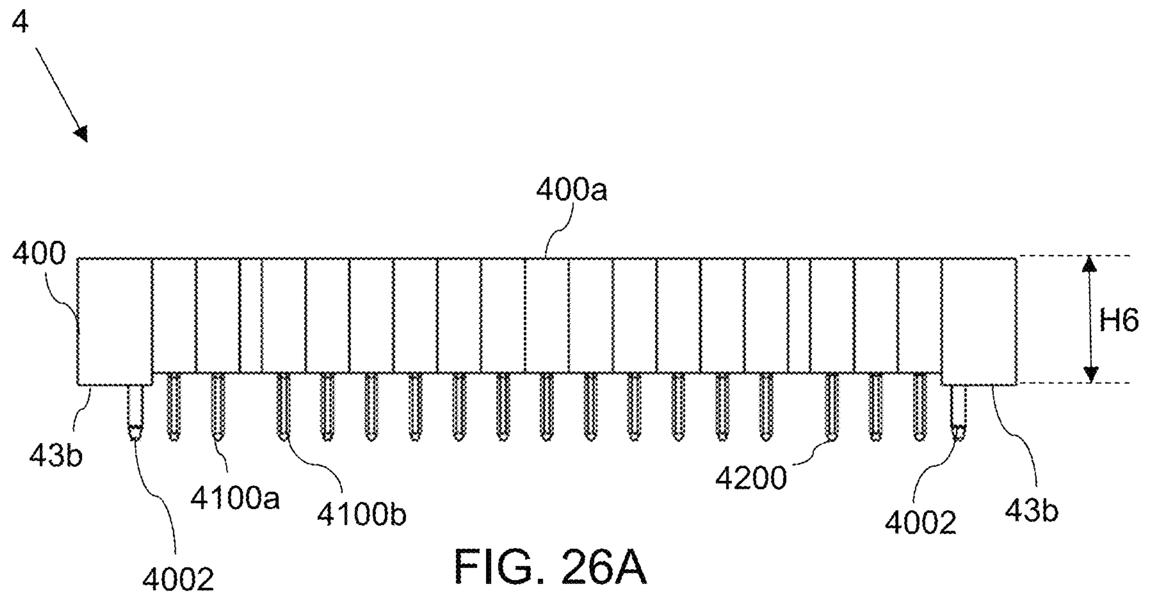
FIGS. 26A and 26B are a side elevational view and a top plan view, respectively, of the plug connector of FIG. 17.
Figure 26B:
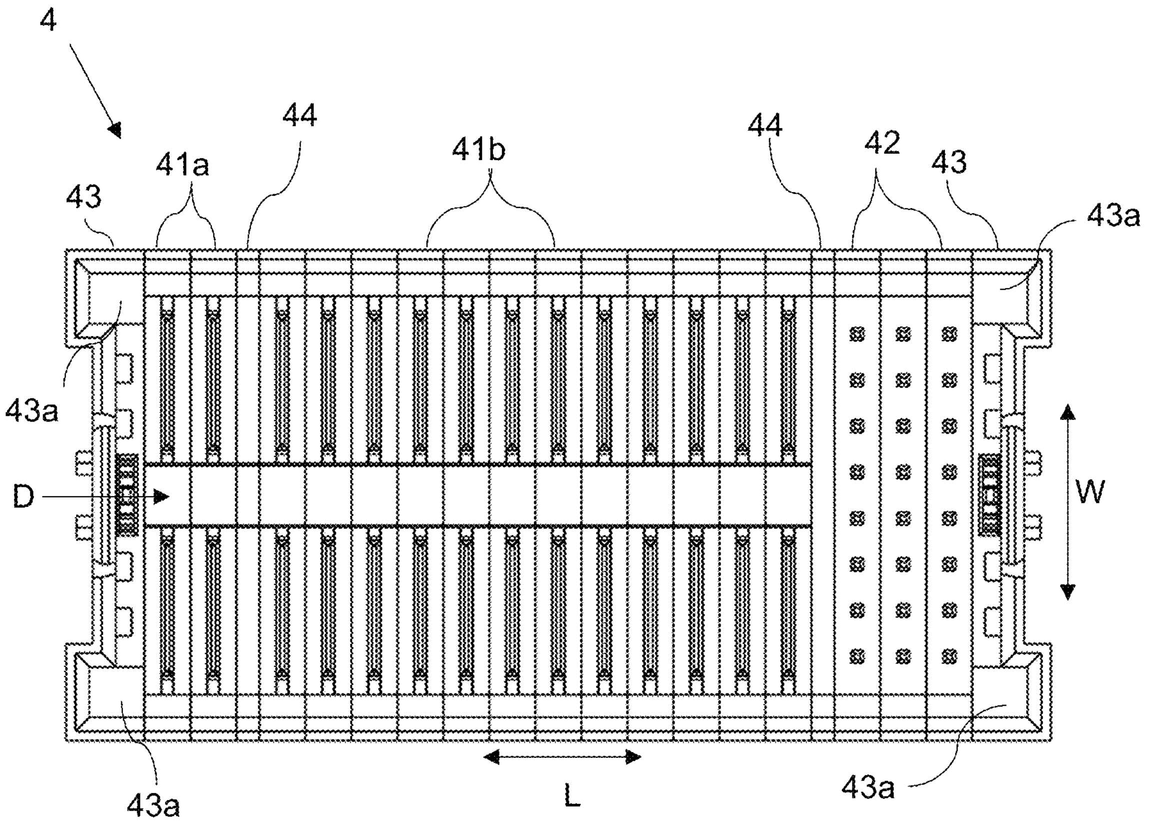

FIG. 26A shows an elevational view of a side of the plug connector 4, and FIG. 26B shows a plan view of a top of the connector 4, according to some embodiments. In some embodiments, the connector 4 may be comprised of a plurality of first power segments 41*a*, a plurality of second power segments 41*b*, a plurality of signal segments 42, and a plurality of end segments 43, discussed below. The end segments 43 may be disposed on opposite ends of the connector 4, such that the first and second power segments 41*a*, 41*b* and the signal segments 42 are disposed between the end segment 43. In some embodiments, the first power segments 41*a* may be grouped together, the second power segments 41*b* may be grouped together, and the signal segments 42 are grouped together, as shown. In some other embodiments, the first and second power segments 41*a*, 41*b* may be interspersed with the signal segments 42. In some embodiments, a spacer segment 44 may be used to separate one or more other segments. In the illustrated embodiment, a spacer segment 44 separates the first and second power segments 41*a*, 41*b* from the signal segments 42, and another spacer segment 44 separates the first power segments 41*a* from the second power segments 41*b*.

According to some embodiments, the housing 400 may contact the substrate 40 at mounting surfaces 43*b* of the end segments 43. In some embodiments, the housing 400 may have a height H6 that extends perpendicularly from a height of an outer edge 400*a* of the housing 400 to a height of the mounting surface 43*b*, as shown in FIG. 26A. In some embodiments, a mating height of the plug connector 4 may correspond to the height H6 and may be in a range of 2 mm to 8 mm. For example, the mating height H6 may be 2.50 mm, or 3.50 mm, or 5.50 mm, or 7.50 mm.

In some embodiments, a sum of the mating height H5 of the receptacle connector 3 and the mating height H6 of the plug connector 6 may be the stack height of the mated pair of the connectors 3, 4. For example, the stack height of the mated pair of connectors 3, 4 may be 8.00 mm, corresponding to H5=5.50 mm and H6=2.50 mm.

Figure 27A:
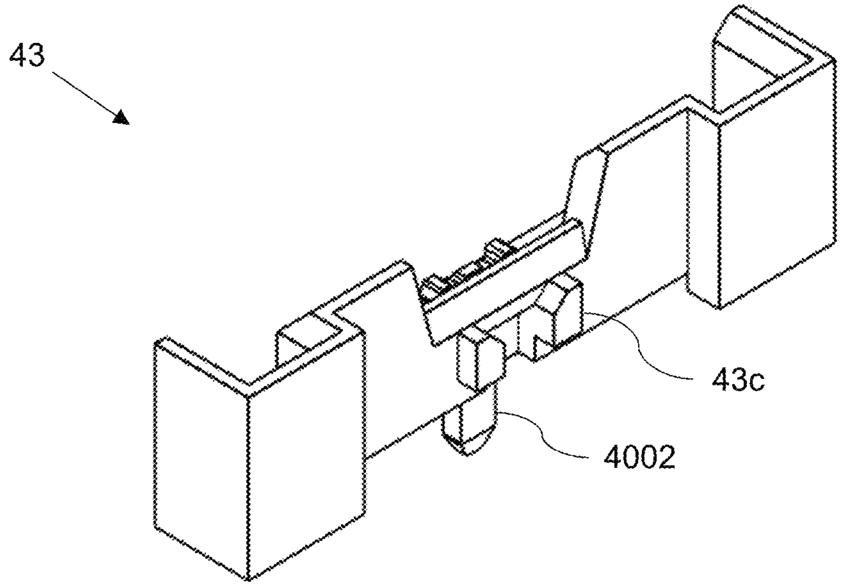
FIGS. 27A and 27B are a top front perspective view and a top rear perspective view, respectively, of an end segment of the plug connector of FIG. 17.
Figure 27B:
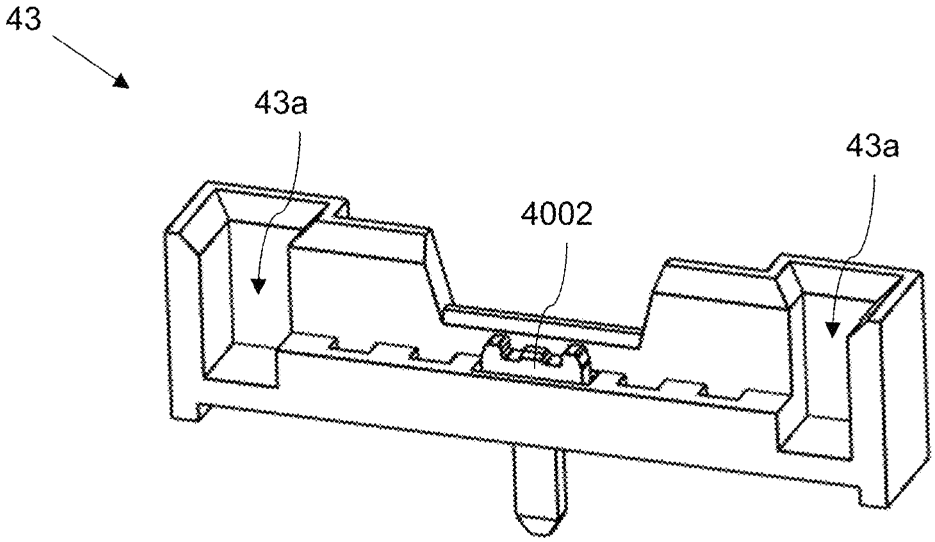

FIG. 27A shows a perspective view of a front side of the end segment 43, and FIG. 27B shows a perspective view of a rear side of the end segment 43, according to some embodiments. The end segment 43 may be comprised of a latch portion 43*c* configured to latch with a corresponding latch portion (e.g., the latch portion 18*a*) of the cap 18. In some embodiments, the end segment 43 may be comprised of a through-hole through which a mounting end of the mounting terminal 4002 may be inserted. When the end segments 43 are mounted to the substrate 40, the hold downs 4002 may serve to hold opposite ends of the plug connector 4 against the substrate 40.

According to some embodiments, each of the end segments 43 may be comprised of a plurality of recesses 43*a* extending below a height of the mating surface 402. The recesses 43*a* may be mating recesses configured to receive corresponding mating posts (e.g., the projections 43*a*) of a mating connector (e.g., the receptacle connector 3) when the mating connector is in a mated position with the plug connector 4. For example, a pair of recesses 43*a* may be located on opposite ends of each of the end segments 43 and may be used to properly align a mating connector with the connector 4 such that, when properly mated, the mating surface 402 faces a corresponding mating surface (e.g., the mating surface 302) of the mating connector.

Figure 28A:
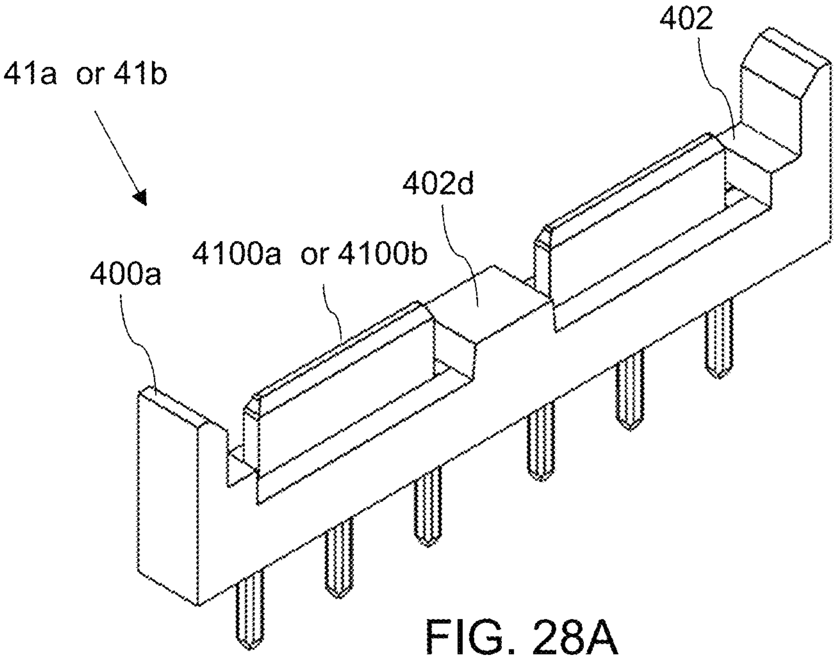
FIGS. 28A and 28B are a top perspective view and a front elevational view, respectively, of a first power segment or a second power segment of the plug connector of FIG. 17.
Figure 28B:
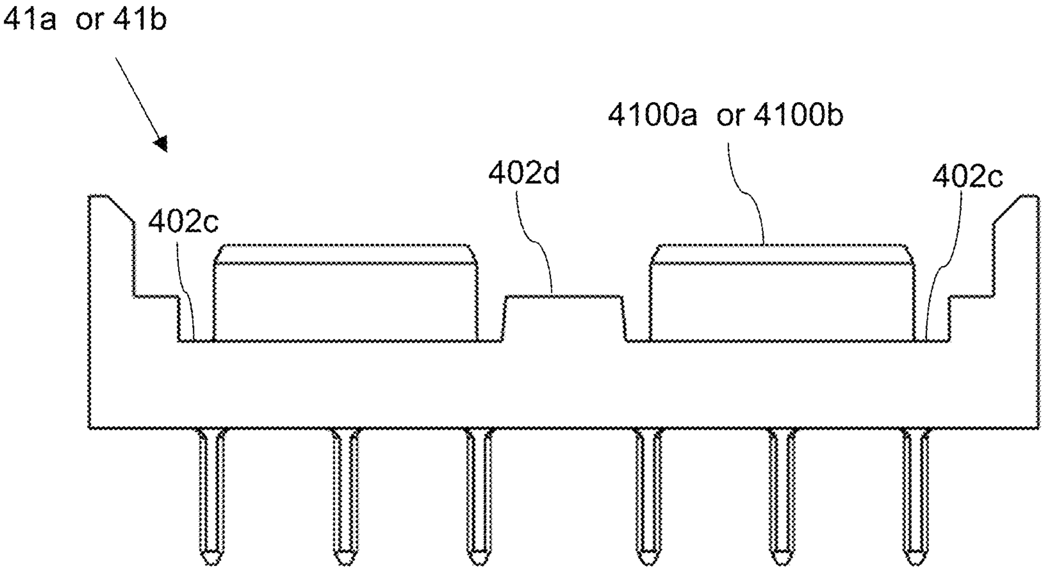

FIGS. 28A and 28B show a perspective view and an elevational view, respectively, of the first power segment 41*a* or the second power segment 41*b*, according to some embodiments. Each of the first and second power segments 41*a*, 41*b* may have the same appearance in these views, as these segments differ only in their internal construction. Internally, however, the first and second power segments 41*a*, 41*b* may be different front each other. In some embodiments, at each of the first and second power segments 41*a*, 41*b*, the mating surface 402 may be contoured and may have a plurality of contact regions 402*c* separated by a separation region 402*d*, which may have a raised height relative to the contact regions 402*c*. The contact openings 402*a* of the first and second power segments 41*a*, 41*b* may be located in the contact regions 402*c*. As shown in FIGS. 25 and 26B, the separation regions 402*d* of the first and second power segments 41*a*, 41*b* of the plug 4 may be aligned, and the pairs of contact regions 402*c* of the first and second power segments 41*a*, 41*b* of the connector 4 may be aligned, such that the connector 4 may have a raised rib D that extends along a length direction L and separates parallel columns of contact regions 402*c*. In some embodiments, the raised rib D may be centrally located midway along a width direction W. In some embodiments, the raised rib D may be configured to be received in a corresponding recessed region (e.g., the channel C) of a mating connector (e.g., the receptacle connector 3) when the connector 4 and the mating connector are in a mated position.

In FIG. 28B, a single separation region 402*d* is disposed between two contact regions 402*c*. However, in other embodiments, the plug connector 4 may have more than one separation region 402*d* separating more than two contact regions 402*c* (e.g., three contact regions 402*c* separated from each other by two separation regions 402*d*).

Figure 29A:
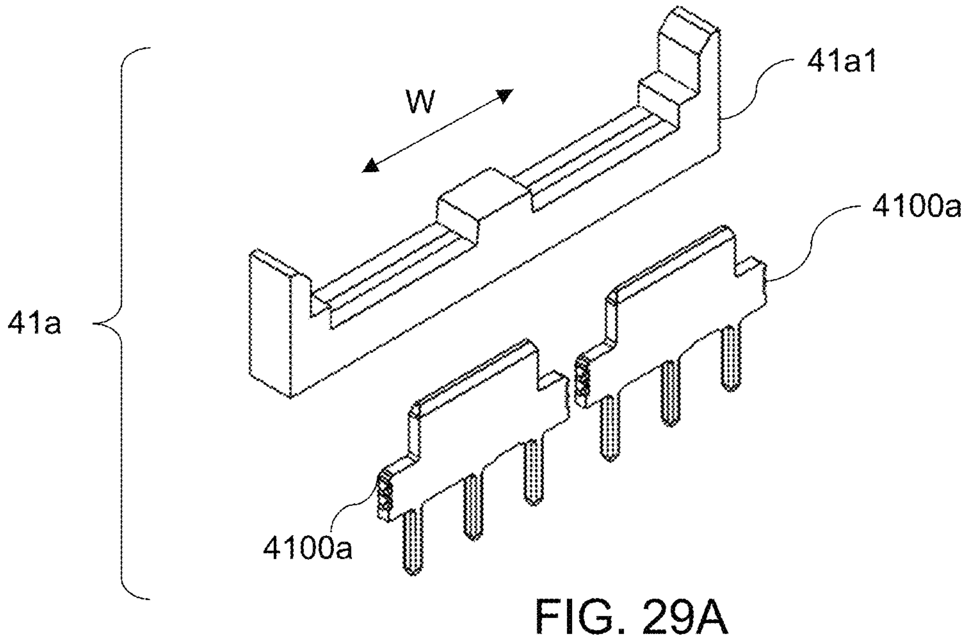
FIGS. 29A and 29B are exploded views of the first power segment and the second power segment, respectively, of the plug connector of FIG. 17.

FIG. 29A shows an exploded perspective view of the first power segment 41*a*, according to some embodiments. In some embodiments, the first power segment 41*a* may be comprised of a housing portion 41*a*1 and multiple first power terminals 4100*a* fixed to the housing portion 41*a*1. The first power terminals 4100*a* may be disposed in a row along a width direction W. In this example, openings in the contact regions 402*c* that receive power terminals may be separated, with a wall in the housing portion in the separation region 402*d* electrically isolating them.

Figures 30A, 30B:
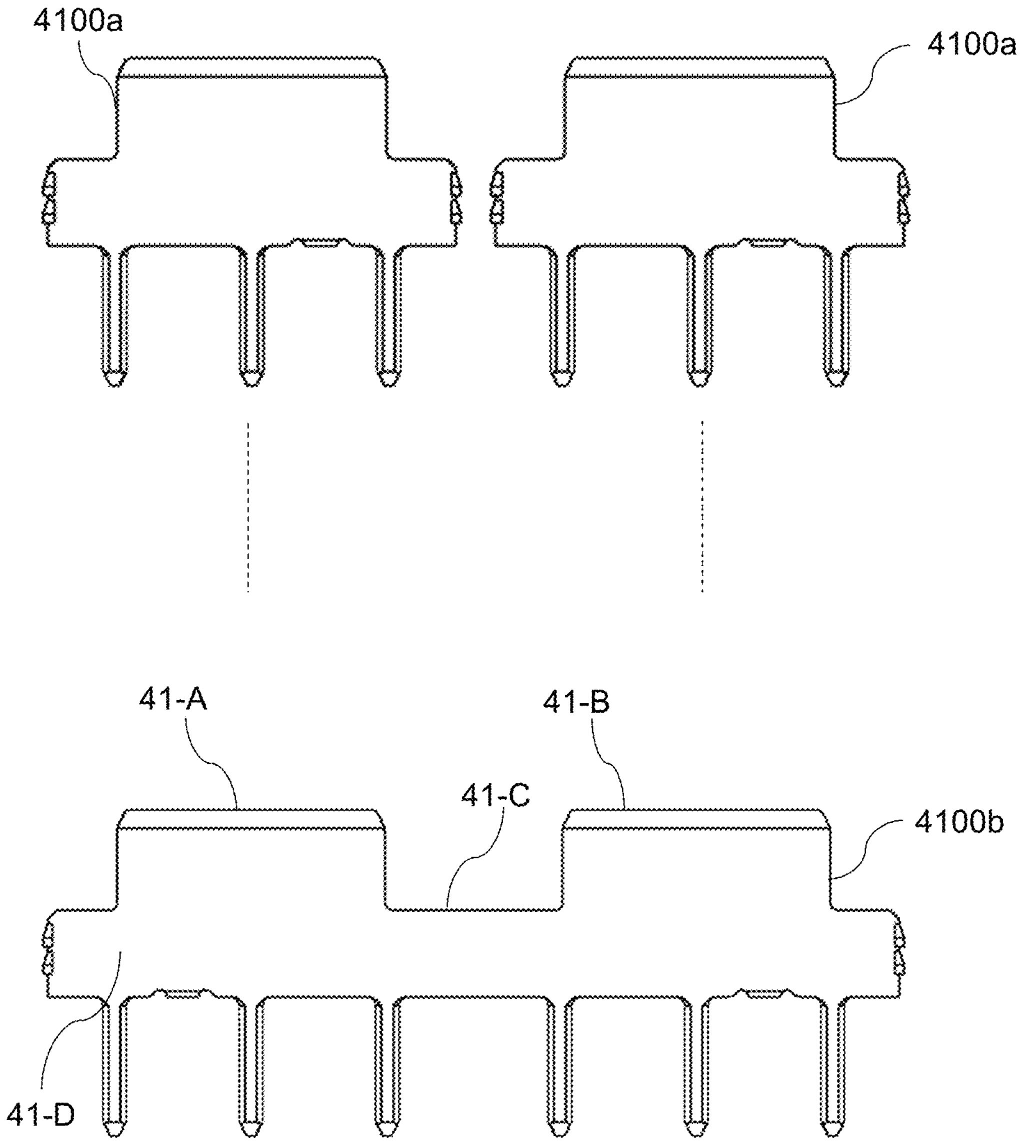
FIG. 30A is a front elevational view of an exemplary embodiment of two first power terminals.
FIG. 30B is a front elevational view of an exemplary embodiment of a second power terminal.

FIG. 30A shows an elevational view of a front side of the first power terminals 4100*a* of the first power segment 41*a*. Each of the first power terminals 4100*a* may be comprised of a tab and may be similar in structure to the power terminal 2100, discussed above, and therefore details regarding the structure of each of the first power terminals 4100*a* will not be repeated.

In FIGS. 29A and 30A, a pair of first power terminals 4100*a* are shown. It should be understood, however, that in other embodiments there may be more than two first power terminals 4100*a* in the first power segment 41*a*.

Figure 29B:
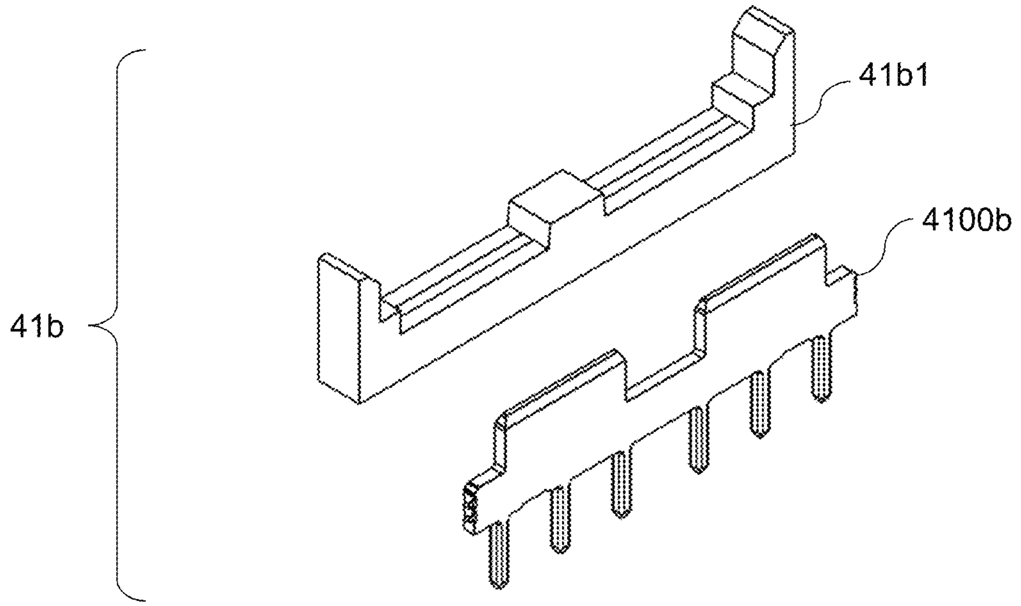

FIG. 29B shows an exploded perspective view of the second power segment 41*b*, according to some embodiments. In some embodiments, the second power segment 41*b* may be comprised of a housing portion 41*b*1 and a single second power terminal 4100*b* fixed to the housing portion 41*b*1. In this example, openings in contact regions 402*c* that receive power terminals may be in communication with each other. For example, the housing portion in separation region 402*d* may include a channel to receive a joint region 41-C.

FIG. 30B shows an elevational view of a front side of the second power terminal 4100*b*. In some embodiments, the second power terminal 4100*b* may be comprised of first and second tabs 41-A, 41-B, respectively, which are physically and electrically connected to each other by a joint region 41-C. The joint region 41-C may have a width such that the first and second tabs 41-A, 41-B align with the tabs of the two first power terminals 4100*a* of the first power segment 41*a*. The first and second tabs 41-A, 41-B may extend from a common body 41-D to the contact openings 402*a* of the second power segment 41*b*.

Figure 31A:
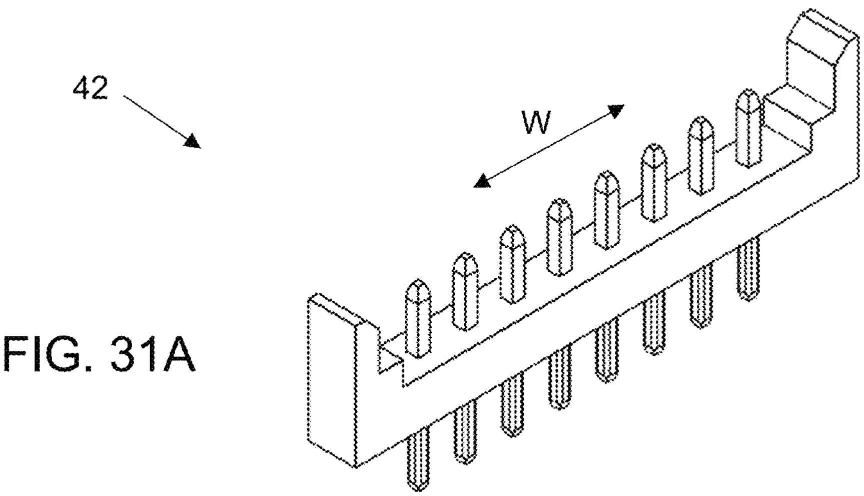
FIGS. 31A and 31B are a top perspective view and an exploded view, respectively, of a signal segment of the plug connector of FIG. 17.
Figure 31B:
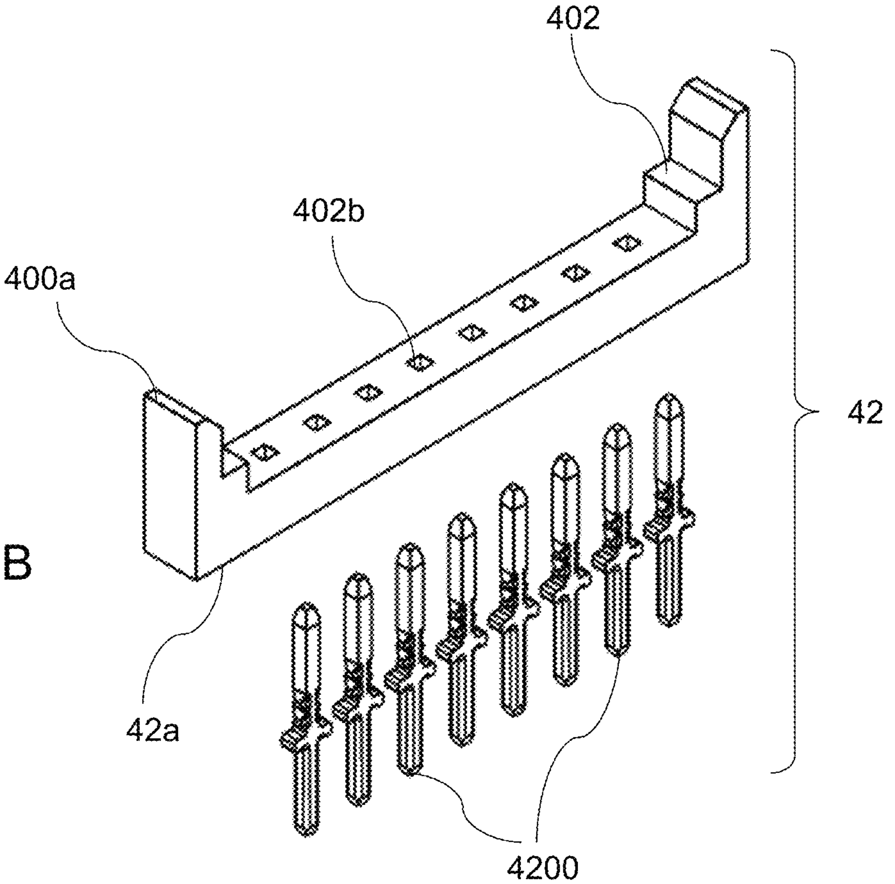

FIG. 31A shows a perspective view of the signal segment 42, according to some embodiments, and FIG. 31B shows an exploded view of the signal segment 42. In some embodiments, each of the signal segments 42 may be comprised of a housing portion 42*a* and a plurality of signal terminals 4200 fixed to the housing portion 42*a*. In the example shown in FIGS. 31A and 31B, a row of eight signal terminals 4200 are disposed in the width direction W of the signal segment 42. In some embodiments, each signal terminal 4200 may be similar in structure to the signal terminal 2200, discussed above, and therefore details regarding the structure of the signal terminals 4200 will not be repeated.

As noted above, according to some aspects, instead of a segmented construction, a connector may be formed with an integral insulative housing holding an array of signal terminals and at least one array of power terminals. The housing may have the same shape and function as the connector housing described above formed by aggregating connector segments. Even if the connector housing is formed as a unitary member rather than from joined connector segments or modules, designers of electronic devices may benefit, as connectors may be formed with any of multiple configurations, varying, for example, in mating height or stack height or in number or current carrying capacity of power terminals. Additionally, the connector can be specified with different numbers of rows of power segments of each of one or more types and/or different numbers of rows of signal segments. The signal and power connections may be the same or may vary in predictable ways for the different modules. As a result, a device designer may qualify a connector in one configuration, which may simplify qualification and use of other configurations based on the same technology, as described herein.

In some embodiments, for example, a connector may be comprised of a signal portion and a power portion. The signal portion may be comprised of signal terminals attached to an insulative signal housing and arranged in rows and columns. The power portion may be comprised of a plurality of rows of first power terminals and a plurality of rows of second power terminals fixedly attached to an insulative power housing. The signal housing and the power housing may be sections of a unitary housing structure or may be separate sections that have been joined to form a combined structure. Each row of the first power terminals may be comprised of at least two first power terminals aligned in the width direction of the connector, with each first power terminal being comprised of a contact portion configured to electrically contact a corresponding contact portion of a mating connector when the connector and the mating connector are in a mated position. Each row of the second power terminals may be comprised of a single second power terminal elongated in the width direction of the connector and comprised of a plurality of contact portions. Connectors with any combination of segments with first power terminals and segments with second first power terminals may be formed.

In some embodiments, the contact portions of the first and second power terminals may align to form columns of contact portions. Each contact portion may be a set of interdigitated fingers (e.g., for a receptacle connector), or each contact portion may be a power tab (e.g., for a plug connector). Each row of the power portion of the connector may have a separation region between adjacent contact portions, such that a columnar structure extends in a direction perpendicular to the rows. For example, the connector may be a plug connector, and the columnar structure may be a raised rib that spans across the first and second power segments. In another example, the connector may be receptacle connector, and the columnar structure may be a longitudinal recess that spans across the first and second power segments.

A method of making an electrical connector, according to some embodiments of the present may be comprised of aligning or stacking a plurality for first power segments and a plurality of second power segments in a length direction, such that contact portions of the first and second power segments are arranged in a plurality of rows and a plurality of columns. When properly aligned, a separation structure in each of the first and second power segments may be aligned to form a longitudinal structure extending across the first and second power segments. The method also may be comprised of aligning a plurality of signal segments with the first and second power segments in the length direction.

In some embodiments, the connector segments may be separately formed and the method may further comprise attaching together the first power segments, the second power segments, the signal segments, and/or first and second end segments, such that the first and second power segments and the signal segments are sandwiched between the first and second end segments. In other embodiments, segments may be joined by combining mold segments to form a mold in which the connector housing, with the desired number and arrangement of segments, may be formed. In yet other embodiments, the segments may be specified as inputs to a design tool that constructs a sold model from which a mold for forming the connector housing may be constructed.

In some embodiments, each of the first power segments may be comprised of at least two conductive first power terminals attached to an insulative first housing portion, each of the second power segments may be comprised of a conductive second power terminal attached to an insulative second housing portion, and each of the signal segments may be comprised of a plurality of conductive signal terminals attached to an insulative third housing portion and arranged in a row in the width direction. Each of the first and second power terminals may be elongated in a width direction perpendicular to the length direction. In some embodiments, each of the first power terminals may be configured to a carry a first maximum power, and each and of the second power terminals may be configured to carry a second maximum power greater than the first maximum power.

It should be understood that various alterations, modifications, and improvements may be made to the structures, configurations, and methods discussed above, and are intended to be within the spirit and scope of the technology disclosed herein. Further, although advantages of the technology disclosed herein may be indicated, it should be appreciated that not every embodiment of the disclosed technology will include every described advantage. Some embodiments may not implement any features described as advantageous herein. Accordingly, the foregoing description and attached drawings are by way of example only.

As one example, terminals are illustrated as having mounting legs for connection to a substrate such as a printed circuit board. The legs may be suitable for through hole soldering of the legs to holes in a printed circuit board. In other embodiments, terminals may have tails in other configurations, such as press fits or surface mount solder tails.

An electrical connector according to the technology described herein may be embodied in different configurations. Example configurations include combinations of configurations (1) through (24), as follows:

(1) An electrical connector, comprising: an insulative housing comprised of a mating surface configured to face a mating connector when the electrical connector and the mating connector are in a mated position; a plurality of conductive first power terminals attached to the housing and exposed at the mating surface through first openings in the housing; a plurality of conductive second power terminals attached to the housing and exposed at the mating surface through second openings in the housing; and a plurality of conductive signal terminals attached to the housing and exposed at the mating surface through third openings in the housing, wherein: each of the first power terminals is configured to a carry a first maximum power, and each of the second power terminals is configured to carry a second maximum power greater than the first maximum power.

(2) The electrical connector of configuration (1), wherein: each of the first power terminals is comprised of a contact portion exposed through a corresponding one of the first openings in the housing, the first power terminals are arranged in a plurality of rows and a plurality of columns such that the first power terminals are electrically insulated from each other, the contact portions of a first column of the first power terminals are separated from the contact portions of a second column of the first power terminals by a longitudinal structure of the housing, and the longitudinal structure is shaped to nest with a corresponding longitudinal structure of the mating connector when the electrical connector and the mating connector are in the mated position.

(3) The electrical connector of configuration (1) or configuration (2), wherein each of the second power terminals is comprised of a plurality of contact portions aligned with the columns of the first power terminals such that the contact portions of the second power terminals aligned with the first column are separated from the contact portions of the second power terminals aligned with the second column by the longitudinal structure of the housing, and, for each of the second power terminals: the contact portions are electrically connected to a common body disposed in the housing, and the contact portions are exposed at the mating surface through the second openings in the housing.

(4) The electrical connector of any of configurations (1) through (3), further comprising: a removable insulative cap configured to cover at least a portion of the first power terminals, the second power terminals, and the signal terminals, the insulative cap being comprised of a plurality of latching portions configured to latch with the housing.

(5) The electrical connector of any of configurations (1) through (4), wherein the electrical connector is a mezzanine connector that, when in the mated position with the mating connector, has a stack height in a range of 8.00 mm to 20.00 mm.

(6) The electrical connector of any of configurations (1) through (5), wherein: the housing is comprised of first and second end portions respectively located on opposite sides of the housing, each of the first and second end portions of the housing is comprised of at least one mating post configured to be received in a corresponding mating recess of the mating connector when the mating connector and the electrical connector are in the mated position, and each of the mating posts has a height greater than a mating height of the housing.

(7) The electrical connector of any of configurations (1) through (6), wherein the longitudinal structure of the housing is comprised of a recessed channel.

(8) The electrical connector of any of configurations (1) through (7), wherein each of the first and second power terminals is comprised of interdigitated fingers configured to press against a corresponding power tab of the mating connector when the mating connector and the electrical connector are in the mated position.

(9) The electrical connector of any of configurations (1) through (8), wherein each of the first and second power terminals is comprised of a pair of first and second finger plates, in which: the first finger plate is comprised of: a plurality of first fingers extending from a first plate body, each of the first fingers being comprised of a first contact surface configured to be in contact with a corresponding power tab of the mating connector when the electrical connector and the mating connector are in the mated position, and a first joining surface configured to be fixed to the second finger plate, and the second finger plate is comprised of: a plurality of second fingers extending from a second plate body, each of the second fingers being comprised of a second contact surface configured to be in contact with the corresponding power tab of the mating when the electrical connector and the mating connector are in the mated position, and a second joining surface configured to be fixed to the first joining surface of the first finger plate, and the first fingers are interdigitated with the second fingers such that the first contact surface faces a same direction as the second joining surface and such that the second contact surface faces a same direction as the first joining surface.

(10) The electrical connector of any of configurations (1) through (9), wherein: for each of the first power terminals, the contact portion is comprised of a first finger section, for each of the second power terminals, the contact portions are comprised of a plurality of second finger sections connected to the common body, and each of the first and second finger sections is comprised of interdigitated fingers configured to press against a corresponding power tab of the mating connector when the mating connector and the electrical connector are in the mated position.

(11) The electrical connector of any of configurations (1) through (10), wherein each of the signal terminals is comprised of a contact configured to receive a corresponding signal-pin terminal of the mating connector when the mating connector and the electrical connector are in the mated position.

(12) The electrical connector of any of configurations (1) through (11), wherein: each of the contacts is comprised of: a first arm comprised of a first contact surface, and a second arm comprised of a second contact surface, and for each of the contact clips, the first and second contact surfaces face each other and are configured to receive the corresponding signal-pin terminal of the mating connector therebetween, a distance between the first and second contact surfaces being such that the corresponding signal-pin terminal is pinched by the first and second contact surfaces when the mating connector and the electrical connector are in the mated position.

(13) The electrical connector of any of configurations (1) through (12), wherein: a mating height of the housing is in a range of 5 mm to 12 mm, and the mating height of the housing is less than a maximum height of the housing.

(14) The electrical connector of any of configurations (1) through (13), wherein the mating height of the housing is one of: 5.50 mm, 7.50 mm, 9.50 mm, and 11.50 mm.

(15) The electrical connector of any of configurations (1) through (14), wherein: the housing is comprised of first and second end portions respectively located on opposite sides of the housing, and each of the first and second end portions of the housing is comprised of at least one mating recess configured to receive a corresponding mating post of the mating connector when the mating connector and the electrical connector are in the mated position.

(16) The electrical connector of any of configurations (1) through (15), wherein the longitudinal structure of the housing is comprised of a raised rib.

(17) The electrical connector of any of configurations (1) through (16), wherein each of the first second and power terminals is comprised of at least one power tab configured to be inserted in a corresponding power-tab receiving portion of the mating connector when the mating connector and the electrical connector are in the mated position.

(18) The electrical connector of any of configurations (1) through (17), wherein: for each of the first power terminals, the contact portion is comprised of a power tab, and for each of the second power terminals, the contact portions are comprised of a plurality of power tabs connected to the common body.

(19) The electrical connector of any of configurations (1) through (18), wherein each of the signal terminals is comprised of a signal pin configured to be inserted in a corresponding pin-receiving terminal of the mating connector when the mating connector and the electrical connector are in the mated position.

(20) The electrical connector of any of configurations (1) through (19), wherein: a mating height of the housing is in a range of 2 mm to 8 mm, and the mating height of the housing is a maximum height of the housing.

(21) The electrical connector of any of configurations (1) through (20), wherein the mating height of the housing is one of: 2.50 mm, 3.50 mm, 5.50 mm, and 7.50 mm.

(22) The electrical connector of any of configurations (1) through (21), wherein the electrical connector has a segmented construction such that: the housing is comprised of a plurality of first housing portions, with each of the first housing portions being configured to support a group of the signal terminals aligned in a row direction, the housing is comprised of a plurality of second housing portions, with each of the second housing portions being configured to support at least two of the first power terminals aligned in the row direction, the housing is comprised of a plurality of third housing portions, with each of the third housing portions being configured to support one of the second power terminals, and the housing is comprised of first and second end housing portions located on opposite ends of the electrical connector.

(23) The electrical connector of any of configurations (1) through (22), further comprising: a spacer portion separating the first housing portions from the second and third housing portions.

(24) The electrical connector of any of configurations (1) through (23), further comprising: a spacer portion separating the second housing portions from the third housing portions.

An electrical connector according to the technology described herein may be embodied in different configurations. Example configurations include combinations of configurations (25) through (40), as follows:

(25) An electrical connector, comprising: a plurality of power segments aligned in a length direction, each of the power segments being comprised of a conductive power terminal attached to a first insulative housing portion, the power terminal being elongated in a width direction perpendicular to the length direction; a plurality of signal segments aligned in the length direction, each of the signal segments being comprised of a plurality of conductive signal terminals attached to a second insulative housing portion; a first end segment comprised of a first insulative end portion and a first mounting post disposed in the first insulative end portion; and a second end segment comprised of a second insulative end portion and a second mounting post disposed in the second insulative end portion, wherein: the power segments and the signal segments are disposed between the first and second end segments, the first and second mounting posts are configured to attach the first and second end segments, respectively, to a substrate, each of the first and second end segments is comprised of a mating structure configured to engage with a corresponding mating structure of a mating connector when the electrical connector and the mating connector are in a mated position, the first and second housing portions and the first and second end portions are attached to each other to form a housing comprised of a mating surface configured to face a mating connector when the electrical connector and the mating connector are in the mated position, and the power terminals and the signal terminals are exposed at the mating surface and are configured to electrically contact respective mating terminals of the mating connector when the electrical connector and the mating connector are in the mated position.

(26) The electrical connector of configuration (25), wherein: for each of the power segments, the power terminal is comprised of a contact portion exposed through an opening in the first housing portion, and the mating surface is comprised of a plurality of longitudinal structures configured to nest with a corresponding plurality of longitudinal structures of the mating connector when the electrical connector and the mating connector are in the mated position.

(27) The electrical connector of configuration (25) or configuration (26), further comprising: a spacer segment separating the power segments from the signal segments.

(28) The electrical connector of any of configurations (25) through (27), further comprising: a removable insulative cap configured to cover at least a portion of each of the power segments and the signal segments, the insulative cap being comprised of: a first latching portion configured to latch with the first end segment, and a second latching portion configured to latch with the second end segment.

(29) The electrical connector of any of configurations (25) through (28), wherein the mating structure of each of the first and second end segments is comprised of at least one mating post configured to be received in a corresponding mating recess of the mating connector when the electrical connector and the mating connector are in the mated position.

(30) The electrical connector of any of configurations (25) through (29), wherein each of the mating posts has a height greater than a mating height of the housing.

(31) The electrical connector of any of configurations (25) through (30), wherein each of the power terminals is comprised of interdigitated fingers configured to press against a corresponding power tab of a mating connector when the electrical connector and the mating connector are in the mated position.

(32) The electrical connector of any of configurations (25) through (31), wherein each of the power terminals is comprised of a pair of first and second finger plates, in which: the first finger plate is comprised of: a plurality of first fingers extending from a first plate body, each of the first fingers being comprised of a first contact surface configured to be in contact with a corresponding power tab of the mating connector when the electrical connector and the mating connector are in the mated position, and a first joining surface configured to be fixed to the second finger plate, and the second finger plate is comprised of: a plurality of second fingers extending from a second plate body, each of the second fingers being comprised of a second contact surface configured to be in contact with the corresponding power tab of the mating connector when the electrical connector and the mating connector are in the mated position, and a second joining surface configured to be fixed to the first joining surface of the first finger plate, and the first fingers are interdigitated with the second fingers such that the first contact surface faces a same direction as the second joining surface and such that the second contact surface faces a same direction as the first joining surface.

(33) The electrical connector of any of configurations (25) through (32), wherein each of the signal terminals is comprised of a contact configured to receive a corresponding signal-pin terminal of the mating connector when the mating connector and the electrical connector are in the mated position.

(34) The electrical connector of any of configurations (25) through (33), wherein a mating height of the housing is in a range of 5 mm to 12 mm.

(35) The electrical connector of any of configurations (25) through (34), wherein the mating height of the housing is one of: 5.50 mm, 7.50 mm, 9.50 mm, and 11.50 mm.

(36) The electrical connector of any of configurations (25) through (35), wherein the mating structure of each of the first and second end segments is comprised of at least one mating recess configured to receive a corresponding mating post of the mating connector when the electrical connector and the mating connector are in the mated position.

(37) The electrical connector of any of configurations (25) through (36), wherein each of the power terminals is comprised of a power tab configured to be inserted in a corresponding power-tab receiving portion of the mating connector when the electrical connector and the mating connector are in the mated position.

(38) The electrical connector of any of configurations (25) through (37), wherein each of the signal terminals is comprised of a signal pin configured to be inserted in a corresponding pin-receiving terminal of the mating connector when the electrical connector and the mating connector are in the mated position.

(39) The electrical connector of any of configurations (25) through (38), wherein: a mating height of the housing is in a range of 2 mm to 8 mm, and the mating height of the housing is a maximum height of the common housing.

(40) The electrical connector of any of configurations (25) through (39), wherein the mating height of the housing is one of: 2.50 mm, 3.50 mm, 5.50 mm, and 7.50 mm.

An electrical connector according to the technology described herein may be embodied in different configurations. Example configurations include combinations of configurations (41) through (56), as follows:

(41) An electrical connector, comprising: an insulative housing comprised of a mating surface configured to face a mating connector when the electrical connector and the mating connector are in a mated position; a plurality of conductive power terminals attached to the housing and exposed at the mating surface through first openings in the housing, the power terminals being arranged in a column in a length direction of the housing, each of the power terminals being elongated in a width direction perpendicular to the length direction; and a plurality of conductive signal terminals attached to the housing and exposed at the mating surface through second openings in the housing, the signal terminals being arranged in a plurality of rows in the width direction, each of the rows containing at least two of the signal terminals, wherein the housing is comprised of first and second end portions on opposite ends of the housing, each of the first and second end portions being comprised of a mating structure configured to engage with a corresponding mating structure of a mating connector when the electrical connector and the mating connector are in a mated position.

(42) The electrical connector of configuration (41), wherein the power terminals comprise: a single type of power terminal, or at least two types of power terminals.

(43) The electrical connector of configuration (41) or configuration (42), wherein the at least two types of power terminals include: first power terminals configured to a carry a first maximum power, and second power terminals configured to carry a second maximum power greater than the first maximum power.

(44) The electrical connector of any of configurations (41) through (43), wherein the electrical connector is a mezzanine connector that, when in the mated position with the mating connector, has a stack height in a range of 8.00 mm to 20.00 mm.

(45) The electrical connector of any of configurations (41) through (44), wherein each of the mating structures of the first and second end portions of the housing is comprised a mating post configured to be received in a corresponding mating recess of the mating connector when the mating connector and the electrical connector are in the mated position, each of the mating posts having a height greater than a mating height of the housing.

(46) The electrical connector of any of configurations (41) through (45), wherein each of the power terminals is comprised of interdigitated fingers configured to press against a corresponding power tab of the mating connector when the mating connector and the electrical connector are in the mated position.

(47) The electrical connector of any of configurations (41) through (46), wherein each of the power terminals is comprised of a pair of first and second finger plates, in which: the first finger plate is comprised of: a plurality of first fingers extending from a first plate body, each of the first fingers being comprised of a first contact surface configured to be in contact with the corresponding power tab of the mating connector when the mating connector and the electrical connector are in the mated position, and a first joining surface configured to be fixed to the second finger plate, and the second finger plate is comprised of: a plurality of second fingers extending from a second plate body, each of the second fingers being comprised of a second contact surface configured to be in contact with the corresponding power tab of the mating connector when the mating connector and the electrical connector are in the mated position, and a second joining surface configured to be fixed to the first joining surface of the first finger plate, and the first fingers are interdigitated with the second fingers such that the first contact surface faces a same direction as the second joining surface and such that the second contact surface faces a same direction as the first joining surface.

(48) The electrical connector of any of configurations (41) through (47), wherein each of the signal terminals is comprised of a contact configured to receive a corresponding signal-pin terminal of the mating connector when the mating connector and the electrical connector are in the mated position.

(49) The electrical connector of any of configurations (41) through (48), wherein: each of the contacts is comprised of: a first arm comprised of a first contact surface, and a second arm comprised of a second contact surface, and for each of the contacts, the first and second contact surfaces face each other and are configured to receive the corresponding signal-pin terminal of the mating connector therebetween, a distance between the first and second contact surfaces being such that the corresponding signal-pin terminal is pinched by the first and second contact surfaces when the mating connector and the electrical connector are in the mated position.

(50) The electrical connector of any of configurations (41) through (49), wherein: a mating height of the housing is in a range of 5 mm to 12 mm, and the mating height of the housing is less than a maximum height of the housing.

(51) The electrical connector of any of configurations (41) through (50), wherein the mating height of the housing is one of: 5.50 mm, 7.50 mm, 9.50 mm, and 11.50 mm.

(52) The electrical connector of any of configurations (41) through (51), wherein each of the mating structures of the first and second end portions of the housing is comprised of a mating recess configured to receive a corresponding mating post of the mating connector when the mating connector and the electrical connector are in the mated position.

(53) The electrical connector of any of configurations (41) through (52), wherein each of the power terminals is comprised of at least one power tab configured to be inserted in a corresponding power-tab receiving portion of the mating connector when the mating connector and the electrical connector are in the mated position.

(54) The electrical connector of any of configurations (41) through (53), wherein each of the signal terminals is comprised of a signal pin configured to be inserted in a corresponding pin-receiving terminal of the mating connector when the mating connector and the electrical connector are in the mated position.

(55) The electrical connector of any of configurations (41) through (54), wherein: a mating height of the housing is in a range of 2 mm to 8 mm, and the mating height of the housing is a maximum height of the housing.

(56) The electrical connector of any of configurations (41) through (55), wherein the mating height of the housing is one of: 2.50 mm, 3.50 mm, 5.50 mm, and 7.50 mm.

An electrical connector according to the technology described herein may be embodied in different configurations. Example configurations include combinations of configurations (57) through (76), as follows:

(57) An electrical connector, comprising: a plurality of first power segments aligned in a length direction, each of the first power segments being comprised of at least two conductive first power terminals attached to an insulative first housing portion, each of the first power terminals being elongated in a width direction perpendicular to the length direction; a plurality of second power segments aligned in the length direction, each of the second power segments being comprised of a conductive second power terminal attached to an insulative second housing portion, the second power terminal being elongated in the width direction; and a plurality of signal segments aligned in the length direction, each of the signal segments being comprised of a plurality of conductive signal terminals attached to an insulative third housing portion and arranged in a row in the width direction, wherein: each of the first power terminals is configured to a carry a first maximum power, and each of the second power terminals is configured to carry a second maximum power greater than the first maximum power.

(58) The electrical connector of configuration (57), further comprising: a first end segment comprised of an insulative first end portion and a first mounting post disposed in the first end portion, and a second end segment comprised of an insulative second end portion and a second mounting post disposed in the second end portion, wherein: the first and second power segments and the signal segments are disposed between the first and second end segments, the first and second mounting posts are configured to attach the first and second end segments, respectively, to a circuit board, and each of the first and second end segments is comprised of a mating structure configured to engage with a corresponding mating structure of the mating connector when the electrical connector and the mating connector are in a mated position.

(59) The electrical connector of configuration (57) or configuration (58), wherein: the first, second, and third housing portions and the first and second end portions are attached to each other to form a housing comprised of a mating surface configured to face the mating connector when the electrical connector and the mating connector are in the mated position, and the first power terminals, the second power terminals, and the signal terminals are exposed at the mating surface and are configured to electrically contact respective mating terminals of the mating connector when the electrical connector and the mating connector are in the mated position.

(60) The electrical connector of any of configurations (57) through (59), wherein: for each of the first power segments, each of the first power terminals is comprised of a contact portion exposed through a corresponding first opening in the first housing portion, for each of the first power segments, the first housing portion is comprised of a separation portion configured to separate a first one of the contact portions from a second one of the contact portions, the first power terminals of the first power segments are aligned such that the contact portions of the first power terminals are arranged in first and second columns separated from each other by a first elongated structure extending in the length direction, and the first elongated structure is formed of the separation portions of the first housing portions aligned in the length direction.

(61) The electrical connector of any of configurations (57) through (60), wherein: for each of the second power segments, the second power terminal is comprised of a pair of contact portions connected to a common body, the pair of contact portions being arranged in a row in the width direction and respectively exposed through corresponding second openings in the second housing portion, for each of the second power segments, the second housing portion is comprised of a separation portion configured to separate a first one of the contact portions of the pair from a second one of the contact portions of the pair, the second power terminals of the second power segments are aligned such that the pairs of contact portions of the second power terminals are arranged in a pair of columns aligned with the first and second columns of the first power segments, the pair of columns being separated from each other by a second elongated structure extending in the length direction, the second elongated structure is formed of the separation portions of the second housing portions aligned in the length direction, and the first and second elongated structures are aligned with each other to form a longitudinal structure shaped to nest with a corresponding longitudinal structure of the mating connector when the electrical connector and the mating connector are in the mated position.

(62) The electrical connector of any of configurations (57) through (61), further comprising: a spacer segment separating the first power segments from the second power segments.

(63) The electrical connector of any of configurations (57) through (62), further comprising: a spacer segment separating the signal segments from the first and second power segments.

(64) The electrical connector of any of configurations (57) through (63), further comprising: a removable insulative cap configured to cover at least a portion of each of the first and second power segments and the signal segments, the insulative cap being comprised of: a first latching portion configured to latch with the first end segment, and a second latching portion configured to latch with the second end segment.

(65) The electrical connector of any of configurations (57) through (64), wherein: the mating structure of each of the first and second end segments is comprised of at least one mating post configured to be received in a corresponding mating recess of the mating connector when the electrical connector and the mating connector are in the mated position, each of the mating posts having a height greater than a mating height of the electrical connector, and the longitudinal structure is comprised of a recessed channel.

(66) The electrical connector of any of configurations (57) through (65), wherein each of the contact portions of the first and second power terminals is comprised of interdigitated fingers configured to press against a corresponding power tab of the mating connector when the electrical connector and the mating connector are in the mated position.

(67) The electrical connector of any of configurations (57) through (66), wherein each of the signal terminals is comprised of a contact configured to receive a corresponding signal-pin terminal of the mating connector when the electrical connector and the mating connector are in the mated position.

(68) The electrical connector of any of configurations (57) through (67), wherein: each of the contacts is comprised of: a first arm comprised of a first contact surface, and a second arm comprised of a second contact surface, and for each of the contact clips, the first and second contact surfaces face each other and are configured to receive the corresponding signal-pin terminal of the mating connector therebetween, a distance between the first and second contact surfaces being such that the corresponding signal-pin terminal is pinched by the first and second contact surfaces when the electrical connector and the mating connector are in the mated position.

(69) The electrical connector of any of configurations (57) through (68), wherein, for each of the contact clips, the first and second arms are angled towards each other to allow the first and second contact surfaces to press against the corresponding signal-pin when the electrical connector and the mating connector are in the mated position.

(70) The electrical connector of any of configurations (57) through (69), wherein: a mating height of the housing is in a range of 5 mm to 12 mm, and the mating height of the housing is less than a maximum height of the common housing.

(71) The electrical connector of any of configurations (57) through (70), wherein the mating height of the common housing is one of: 5.50 mm, 7.50 mm, 9.50 mm, and 11.50 mm.

(72) The electrical connector of any of configurations (57) through (71), wherein: the mating structure of each of the first and second end segments is comprised of at least one mating recess configured to receive a corresponding mating post of the mating connector when the electrical connector and the mating connector are in the mated position, and the longitudinal structure is comprised of a raised rib.

(73) The electrical connector of any of configurations (57) through (72), wherein each of the contact portions of the first and second and power terminals is comprised of a power tab configured to be inserted in a corresponding power-tab receiving portion of the mating connector when the electrical connector and the mating connector are in the mated position.

(74) The electrical connector of any of configurations (57) through (73), wherein each of the signal terminals is comprised of a signal pin configured to be inserted in a corresponding pin-receiving terminal of the mating connector when the electrical connector and the mating connector are in the mated position.

(75) The electrical connector of any of configurations (57) through (74), wherein: a mating height of the housing is in a range of 2 mm to 8 mm, and the mating height of the housing is a maximum height of the common housing.

(76) The electrical connector of any of configurations (57) through (75), wherein the mating height of the housing is one of: 2.50 mm, 3.50 mm, 5.50 mm, and 7.50 mm.

An electrical connector according to the technology described herein may be embodied in different configurations. Example configurations include combinations of configurations (78) through (80), as follows:

(78) An electrical connector, comprising: a plurality of power segments aligned in a length direction, each of the power segments being comprised of at least one conductive power terminal attached to an insulative power-terminal housing portion, each of the power terminals being elongated in a width direction perpendicular to the length direction; and a plurality of signal segments aligned in the length direction, each of the signal segments being comprised of a plurality of conductive signal terminals attached to an insulative signal-terminal housing portion and arranged in a row in the width direction.

(79) The electrical connector of configuration (78), wherein the power segments comprise: a single type of power segment, or at least two types of power segments.

(80) The electrical connector of configuration (79), wherein the at least two types of power segments include: a first type of power segment comprised of at least two conductive first power terminals, each of the first power terminals being elongated in the width direction, and each of the first power terminals being configured to a carry a first maximum power, and a second type of power segment comprised of a second power terminal elongated in the width direction, the second power terminal being configured to carry a second maximum power greater than the first maximum power.

CONCLUSION

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. An electrical connector, comprising:

an insulative housing comprised of a mating surface configured to face a mating connector when the electrical connector and the mating connector are in a mated position;

a plurality of conductive first power terminals attached to the housing and exposed at the mating surface through first openings in the housing;

a plurality of conductive second power terminals attached to the housing and exposed at the mating surface through second openings in the housing; and a plurality of conductive signal terminals attached to the housing and exposed at the mating surface through third openings in the housing, wherein:

each of the first power terminals is configured to a carry a first maximum power, each of the second power terminals is configured to carry a second maximum power greater than the first maximum power, each of the first power terminals is comprised of a contact portion, comprised of a power tab, exposed through a corresponding one of the first openings in the housing, and each of the second power terminals is comprised of a plurality of contact portions electrically connected to a common body, the plurality of contact portions comprised of a plurality of power tabs connected to the common body.

2. The electrical connector of claim 1, wherein:

the first power terminals are arranged in a plurality of rows and a plurality of columns such that the first power terminals are electrically insulated from each other, the contact portions of a first column of the first power terminals are separated from the contact portions of a second column of the first power terminals by a longitudinal structure of the housing, and the longitudinal structure is shaped to nest with a corresponding longitudinal structure of the mating connector when the electrical connector and the mating connector are in the mated position.

3. The electrical connector of claim 2, wherein each of the second power terminals is comprised of the plurality of contact portions aligned with the columns of the first power terminals such that the contact portions of the second power terminals aligned with the first column are separated from the contact portions of the second power terminals aligned with the second column by the longitudinal structure of the housing, and, for each of the second power terminals: the contact portions are electrically connected to the common body disposed in the housing, and the contact portions are exposed at the mating surface through the second openings in the housing.

4. The electrical connector of claim 3, wherein:

the housing is comprised of first and second end portions respectively located on opposite sides of the housing, each of the first and second end portions of the housing is comprised of at least one mating post configured to be received in a corresponding mating recess of the mating connector when the mating connector and the electrical connector are in the mated position, and each of the mating posts has a height greater than a mating height of the housing.

5. The electrical connector of claim 4, wherein the longitudinal structure of the housing is comprised of a recessed channel.

6. The electrical connector of claim 4, wherein each of the first and second power terminals is comprised of interdigitated fingers configured to press against a corresponding power tab of the mating connector when the mating connector and the electrical connector are in the mated position.

7. The electrical connector of claim 4, wherein: a mating height of the housing is in a range of 5 mm to 12 mm, and the mating height of the housing is less than a maximum height of the housing.

8. The electrical connector of claim 3, wherein:

the housing is comprised of first and second end portions respectively located on opposite sides of the housing, and each of the first and second end portions of the housing is comprised of at least one mating recess configured to receive a corresponding mating post of the mating connector when the mating connector and the electrical connector are in the mated position.

9. The electrical connector of claim 8, wherein the longitudinal structure of the housing is comprised of a raised rib.

10. The electrical connector of claim 8, wherein:

a mating height of the housing is in a range of 2 mm to 8 mm, and the mating height of the housing is a maximum height of the housing.

11. The electrical connector of claim 3, wherein the electrical connector has a segmented construction such that: the housing is comprised of a plurality of first housing portions, with each of the first housing portions being configured to support a group of the signal terminals aligned in a row direction, the housing is comprised of a plurality of second housing portions, with each of the second housing portions being configured to support at least two of the first power terminals aligned in the row direction, the housing is comprised of a plurality of third housing portions, with each of the third housing portions being configured to support one of the second power terminals, and the housing is comprised of first and second end housing portions located on opposite ends of the electrical connector.

12. An electrical connector, comprising:

an insulative housing comprised of a mating surface configured to face a mating connector when the electrical connector and the mating connector are in a mated position;

a plurality of conductive power terminals attached to the housing and exposed at the mating surface through first openings in the housing, the power terminals being arranged in a column in a length direction of the housing, each of the power terminals being elongated in a width direction perpendicular to the length direction, wherein:

the power terminals comprise at least two types of power terminals configured to be exposed at the mating surface through the first openings, a first of the at least two types of power terminals comprises fewer contact portions than a second of the at least two types of power terminals; and a plurality of conductive signal terminals attached to the housing and exposed at the mating surface through second openings in the housing, the signal terminals being arranged in a plurality of rows in the width direction, each of the rows containing at least two of the signal terminals, wherein:

the housing is comprised of first and second end portions on opposite ends of the housing, each of the first and second end portions being comprised of a mating structure configured to engage with a corresponding mating structure of a mating connector when the electrical connector and the mating connector are in a mated position.

13. The electrical connector of claim 12, wherein the first of the at least two types of power terminals are first power terminals configured to a carry a first maximum power, and the second of the at least two types of power terminals are second power terminals configured to carry a second maximum power greater than the first maximum power.

14. The electrical connector of claim 12, wherein each of the mating structures of the first and second end portions of the housing is comprised a mating post configured to be received in a corresponding mating recess of the mating connector when the mating connector and the electrical connector are in the mated position, each of the mating posts having a height greater than a mating height of the housing.

15. The electrical connector of claim 14, wherein each of the power terminals is comprised of at least one set of interdigitated fingers configured to press against a corresponding power tab of the mating connector when the mating connector and the electrical connector are in the mated position.

16. The electrical connector of claim 15, wherein each of the power terminals is comprised of at least one pair of first and second finger plates, in which: the first finger plate is comprised of: a plurality of first fingers extending from a first plate body, each of the first fingers being comprised of a first contact surface configured to be in contact with the corresponding power tab of the mating connector when the mating connector and the electrical connector are in the mated position, and a first joining surface configured to be fixed to the second finger plate, and the second finger plate is comprised of: a plurality of second fingers extending from a second plate body, each of the second fingers being comprised of a second contact surface configured to be in contact with the corresponding power tab of the mating connector when the mating connector and the electrical connector are in the mated position, and a second joining surface configured to be fixed to the first joining surface of the first finger plate, and the first fingers are interdigitated with the second fingers such that the first contact surface faces a same direction as the second joining surface and such that the second contact surface faces a same direction as the first joining surface.

17. The electrical connector of claim 14, wherein: a mating height of the housing is in a range of 5 mm to 12 mm, and the mating height of the housing is less than a maximum height of the housing.

18. The electrical connector of claim 12, wherein each of the mating structures of the first and second end portions of the housing is comprised of a mating recess configured to receive a corresponding mating post of the mating connector when the mating connector and the electrical connector are in the mated position.

19. The electrical connector of claim 18, wherein each of the power terminals is comprised of at least one power tab configured to be inserted in a corresponding power-tab receiving portion of the mating connector when the mating connector and the electrical connector are in the mated position.

20. An electrical connector, comprising:

a plurality of power segments aligned in a length direction, each of the power segments being comprised of at least one conductive power terminal attached to an insulative power-terminal housing portion, each of the power terminals being elongated in a width direction perpendicular to the length direction; and a plurality of signal segments aligned in the length direction, each of the signal segments being comprised of a plurality of conductive signal terminals attached to an insulative signal-terminal housing portion and arranged in a row in the width direction, wherein:

the power segments comprise at least two types of power segments including:

a first type of power segment comprised of at least two conductive first power terminals, each of the first power terminals being elongated in the width direction, and each of the first power terminals being configured to a carry a first maximum power, and a second type of power segment comprised of a second power terminal elongated in the width direction, the second power terminal being configured to carry a second maximum power greater than the first maximum power.

* * * * *